US012570219B2

(12) United States Patent
Kent et al.

(10) Patent No.: US 12,570,219 B2
(45) Date of Patent: Mar. 10, 2026

(54) RECREATIONAL VEHICLE STORAGE AND SPEAKER SYSTEMS

(71) Applicant: Polaris Industries Inc., Medina, MN (US)

(72) Inventors: Tyler Kent, Andover, MN (US); Joel Kelso, Star Prairie, WI (US); Douglas Grangroth, Princeton, MN (US); Dean Fremling, Delano, MN (US); Jason Fields, Oak Grove, MN (US); William Strnad, Taylors Falls, MN (US)

(73) Assignee: Polaris Industries Inc., Medina, MN (US)

( * ) Notice: Subject to any disclaimer, the term of this patent is extended or adjusted under 35 U.S.C. 154(b) by 197 days.

(21) Appl. No.: 18/595,980

(22) Filed: Mar. 5, 2024

(65) Prior Publication Data

US 2024/0317146 A1    Sep. 26, 2024

Related U.S. Application Data

(60) Provisional application No. 63/454,463, filed on Mar. 24, 2023.

(51) Int. Cl.
| | | |
|---|---|---|
| *B60R 11/02* | (2006.01) | |
| *H04R 1/28* | (2006.01) | |
| *B60R 11/00* | (2006.01) | |

(52) U.S. Cl.
CPC ........ *B60R 11/0217* (2013.01); *H04R 1/2873* (2013.01); *B60R 2011/0005* (2013.01); *B60R 2011/0094* (2013.01); *H04R 2499/13* (2013.01)

(58) Field of Classification Search
CPC ......... B60R 2011/0005; B60R 11/0217; B60R 2011/0094; H04R 2499/13

USPC .......................................................... 381/86
See application file for complete search history.

(56)    References Cited

U.S. PATENT DOCUMENTS

| | | |
|---|---|---|
| 5,171,054 A | 12/1992 | Wilson |
| 5,663,534 A | 9/1997 | von Hagen et al. |
| 5,938,266 A | 8/1999 | Dauvergne et al. |
| 5,964,491 A | 10/1999 | Marsh et al. |
| 6,578,658 B2 | 6/2003 | Jones et al. |
| 7,717,495 B2 | 5/2010 | Leonard et al. |
| 8,328,235 B2 | 12/2012 | Schneider et al. |
| 8,613,337 B2 | 12/2013 | Kinsman et al. |

(Continued)

FOREIGN PATENT DOCUMENTS

| | | |
|---|---|---|
| DE | 3127068 A1 | 1/1983 |
| DE | 4439461 C1 | 2/1996 |

*Primary Examiner* — George C Monikang
(74) *Attorney, Agent, or Firm* — Merchant & Gould, P.C.

(57)    ABSTRACT

A recreational vehicle with convertible storage-speaker enclosures. Polymer body structures have speaker receiving receptacles with an enclosure portion having a cavity and a mounting interface that may receive a storage compartment cover, or a speaker unit. The storage compartment cover allowing access to the cavity and use as a storage compartment. The speaker units including a speaker baffle assembly with a periphery conformingly sized to seat and seal on a shoulder of the enclosure portion at the mounting interface such that an enclosed and sealed speaker is formed utilizing the enclosure portion. The volume of the enclosure portion and the speaker matched for optimal performance. A storage cover may be removed and the speaker unit inserted into the conformingly shaped storage enclosure with the speaker proximate the opening and pointed into the passenger area.

20 Claims, 31 Drawing Sheets

(56) References Cited

U.S. PATENT DOCUMENTS

| | | | |
|---|---|---|---|
| 8,827,020 | B2 | 9/2014 | Deckard et al. |
| 8,997,908 | B2 | 4/2015 | Kinsman et al. |
| 9,701,346 | B2 | 7/2017 | Deckard et al. |
| 10,246,153 | B2 | 4/2019 | Deckard et al. |
| 11,091,003 | B2 | 8/2021 | Deckard et al. |
| 11,260,803 | B2 | 3/2022 | Fredrickson et al. |
| 2013/0147222 | A1 | 6/2013 | Rana et al. |
| 2017/0174141 | A1 | 6/2017 | Jhant et al. |

RECREATIONAL VEHICLE STORAGE AND SPEAKER SYSTEMS

RELATED APPLICATIONS

This application claims priority to U.S. Provisional Application No. 63/454,463 filed on Mar. 24, 2023, entitled Side By Side Vehicles, the contents of which is expressly incorporated by reference herein.

BACKGROUND

As the popularity of off road recreational vehicles, including side by side recreational vehicles, all-terrain vehicles ("ATV's"), and utility terrain vehicles ("UTV's") has increased, consumer demand for audio in these vehicles has increased and consumers are looking for more audio options in new vehicles. Audio systems have been for a very long time, a required accessory in automotive vehicles when manufactured. Upgrades of the audio systems are readily available, just like trim levels, when a new automotive vehicle is ordered. During the manufacture of automotive vehicles, the manufacturer can readily and cost effectively provide such audio upgrades when vehicles are manufactured without altering passenger area interiors.

Utilizing the audio equipment that works well in automobiles has not proven to perform well in recreational vehicles, particularly those open to the elements. Moreover, adding audio equipment to recreational vehicles has less than ideal results aesthetically, for example, speaker enclosures that project into passenger spaces and have a distinct after market add-on aesthetic. Any improvements in providing better performing audio equipment and aesthetically more pleasing installations, specifically speakers, in recreational vehicles would be welcomed by the industry and consumers. Moreover, facilitating efficient and economical audio installs during manufacture and after the manufacture would be very desirable.

SUMMARY

The inventors have identified and assessed the factors inhibiting the cost effective addition of high level audio systems to these vehicles during manufacture and in the after-market, particularly as compared to audio systems in automotive vehicles. Embodiments disclosed herein provide solutions to the issues and disadvantages of existing systems while providing additional features and advantages. The solutions providing improved economics, case of installation both during manufacture and after, manufacturing efficiencies, and improved performance all associated with audio speaker systems for recreational vehicles.

A significant difference between automobiles and trucks designed for road use and recreational vehicles, including side by side vehicles, all terrain vehicles ("ATV's"), and utility terrain vehicles ("UTV's"), is that the passenger compartments are generally open to the elements, whereas automobiles and trucks have enclosed passenger compartments with hollow body doors and scaling between the door and the vehicle body. Although automobiles and trucks generally cater to smooth comfortable rides, off road vehicles cater to the opposite, rough rides on challenging terrain.

Such ATV's and UTV's are metal framed vehicles, where the frame supports the power train, the driver and passenger seats, cargo beds, the vehicle body, roll cages, passenger compartment floor boards, close off panels, and the dashboard. ATV and UTV manufacturers have long recognized that beyond the chassis, drive train, and suspension, polymer components absorb the shocks and withstand the elements in the harsh conditions in which ATV's and UTV's are used, much better than metal parts, this is particularly true for body components and exposed components in the passenger area. Polymer components can flex when stressed, do not rust, they provide some shock absorption capabilities when impacted, and they do not dent like metal. In such vehicles, it is known to provide dashboards including several polymer components that are exposed to and define forward margins of the passenger compartment. Such polymer components may be generally thin walled, 0.15 inches to 0.40 inches, for example, and may span the width of the forward passenger area of the side by side. Two or more spanning dashboard components may be stacked. Such dashboard may have one or more open storage compartments readily accessible to passengers, or may have storage areas with doors, such as glove boxes. Thus, the polymer dashboard components may be molded with complex shapes for accommodating dashboard equipment, instruments and controls. Moreover, the forward exposed wall of the spanning dashboard members may be reinforced with gussets and other unitary polymer structures for providing structural strength and provide form fit to the vehicle frame members and attachment portions for attachment to the frame.

Automobiles are almost always manufactured and sold with sound systems, with varying levels of upgrades most always available without interior modifications. The inventors have recognized that such sound systems for automobiles and trucks, which have the enclosed passenger compartment can utilize the surfaces defining the passenger compartment to effectively radiate and reflect the sound energy. This facilitates the usage of free air or open baffle mount speakers, as opposed to speakers in sealed enclosures with the open volume in the enclosure optimized for a selected speaker. Free air or open baffle speakers are not mounted in a closed box enclosure with an enclosed volume tuned to the specific speaker. The usage of open baffle speakers in vehicles minimizes or eliminates the concerns of the volumetric space and nature of the space behind the speakers and the interior finishing panels to which they are mounted. For example, such speakers can be readily mounted in doors with the back side of the speaker open into the door cavity. Dashboards, consoles, roofs, and other finished regions of the interiors of automobiles can often accept open baffle speakers without any performance compromise. Generally speaking there is no requirement in these vehicles enclosed interiors that the space behind the open baffle speaker be specially configured, sized, tuned, and/or sealed; the performance of the speaker and sound system is not compromised.

Sound systems for vehicles typically have at least a pair of mid range speakers and often a pair of higher frequency tweeters. Sometimes the tweeter and mid-range speakers are combined in a coaxial speaker. Higher end sound systems may also have a single speaker for low frequency audio known as sub woofer. In off road vehicles and utility vehicles that are generally sold with unenclosed passenger compartments, particularly vehicles known as side by side vehicles, the lack of the enclosed passenger compartment, makes the open baffle speakers much less effective. Utilization of enclosed sealed speaker enclosures in recreational vehicles have better performance in the non-enclosed and sealed passenger areas, but have generally caused increased costs, limited options, and obtrusive speaker mounting locations.

Due to the limited space in such recreational vehicles, providing the complete combination of tweeters, enclosed and sealed mid range speakers and an enclosed and sealed subwoofer, has been particularly difficult. Enclosed and sealed mid range speakers, when installed in recreational vehicles will conventionally be discrete boxes units mounted to a lower margin of the dashboard potentially impairing leg room. This is the case whether the speakers are installed at the factory or after market. Subwoofer enclosures have also been problematic in the limited spaces available.

In a recreational vehicle, polymer body structures present in recreational vehicle, that are supported by the vehicle framework, that are at the margins of and/or define the passenger area, are reconfigured for providing optional or subsequent use of the polymer structures to receive speaker units. In embodiments, the polymer structures providing, in one mode, a unitary molded-in enclosure portion defining a storage cavity accessible from the passenger areas. A mounting interface receives a storage cover or facing that allows passenger access to the storage cavity. The enclosure portion may be converted to a second mode by removing the storage cover or facing and installing a speaker unit which may be attached to the polymer structures at the mounting interface. In embodiments, the speaker units include a speaker baffle assembly including a baffle panel with an aperture having a speaker mounted therein, the periphery of the baffle panel conformingly sized to seat and seal on a shoulder of the storage enclosure at the mounting interface. The speaker selected such that the size of the cavity of the enclosure portion is matched to the speaker. Alternatively, or additionally, the size of the enclosure volume has been preconfigured for a particular speaker or size of speaker. The attachment of the speaker baffle assembly to the enclosure portion providing a sealed speaker enclosure utilizing the polymer structure that alternately defines a storage enclosure as the sealed speaker enclosure.

In embodiments, a sealed speaker unit having a sealed enclosure with a speaker therein, is conformingly sized to be received in the cavity of the enclosure portion of one of the polymer structures. A storage cover may be removed and the speaker unit inserted into the conformingly shaped storage enclosure with the speaker proximate the opening and pointed into the passenger area. In embodiments the speaker unit is fastened into the enclosure such that the exterior of the sealed speaker box engages and/or couples with the interior surfaces of the storage enclosure. A speaker grill may be removably inserted over the speaker facing the passenger area. The grill attachable to an interface portion on the storage enclosure or to the speaker baffle assembly.

In embodiments, a plurality of speaker units sized to the storage enclosures may be installed into the polymer structures, providing an audio system with tweeters, mid range speakers, and a sub woofer.

In embodiments, an enclosure portion is provided as part of a close off panel positioned between the passenger area and the engine region at the rear end of the passenger area behind of seats, and above the horizontal seats. The enclosure portion usable for storage and having an interface to receive a sub woofer speaker baffle assembly thereby providing a volume behind the speaker baffle assembly of from 10 to 12 liters. In embodiments, the depth of the enclosure portion is limited to 4 to 7 inches and two sub woofers are included in the speaker baffler assembly.

In embodiments, the speaker baffle assemblies may have a tweeter mounted therein. In embodiments, the baffle panels may be configured for pointing the tweeter mounted therein and/or the non-tweeter speaker, advantageously toward the passenger seating positions.

In embodiments, the polymer structures with speaker receiving receptacles may have mounting interface for receiving speakers, such as tweeters, but no defined cavity, such as for a storage space, behind the mounting interface. A cover may be installed over the speaker receiving receptacle covering the attachment structure for the speaker, the cover removable for installation of a tweeter. A tweeter grill may then be installed over the tweeter.

A feature and advantage of embodiments is that a closed box speaker is provided utilizing the enclosures that define storage enclosures when the speaker units are not mounted therein. The polymer structures at the margins of the passenger area may be, for example, components of the dashboard, a center console, under seat storage, close off panel structure at the rear of the passenger area. In embodiments, speaker receiving receptacles may be hidden with polymer blanks until speaker units are installed therein.

In embodiments, a method of manufacturing side by side off road vehicles where audio systems equivalent to the factory installed audio system may be retrofitted in the vehicle with minimal effort, minimal alteration of the finishing structures of the passenger area, and no impinging of the space in the passenger area by the retrofit.

A feature and advantage of embodiments is a method of manufacturing side by side off road vehicles where factory installed audio system, specifically the pair of midrange audio speakers in a closed box configuration, may either be added or not in the factory while using the same dashboard structure, and when the pair of midrange speakers is not installed, dashboard structure is finished presenting a pair of storage compartments. A subsequent installation equivalent to the factory installed audio system may be retrofitted in the vehicle with minimal effort, minimal alteration of the finishing structures of the passenger area, and no impinging of the space in the passenger area by the retrofit.

This "factory level" retrofit option further provides the feature and advantage to dealers of off road vehicles to show and tell purchasing consumers of the structural features provided with a new side by side vehicle that is sold without an audio system. More particularly, the dealer's sales people may show the prospective customer the various storage compartments built into the passenger area finishing structures, that can be readily retrofitted, after the sale, by the dealer or the customer, with a factory level sound system that does not impinge into the passenger areas space. Additionally, the dealer can readily show the actual product that can be installed in the side by side after purchase, thereby increasing the probability that the customer will return to the dealer, or the side by side manufacture, to purchase the audio equipment for the aftermarket retrofit.

A feature and advantage of embodiments is that a existing recreational vehicle without an audio system may be retrofitted to have a pair of midrange enclosed boxed speakers utilizing existing storage enclosures in the vehicle, the storage enclosures having covers extending at least partially over the storage enclosures, the retrofit accomplished by removing a pair of storage covers that are each attached to a left and right interface portion s that extend around respective storage enclosures projecting rearwardly from the dashboard, selecting a pair of speaker baffle assemblies, each speaker baffle assemblies each having a baffle panel with an opening and a speaker mounted in the opening, the baffle panel having a front side, a rear side and a peripheral edge portion, installing one of the speaker baffle assemblies to the left interface portion and the other to the right interface portion, where each of the speaker baffle assemblies and the respective storage enclosures provide a closed box mid range speaker.

A feature and advantage of embodiments is that a existing recreational vehicle without an audio system may be retrofitted to have an enclosed sub woofer utilizing an existing storage enclosure in the vehicle, the storage enclosure having cover extending at least partially over an opening to the storage enclosure, the retrofit accomplished by removing the storage cover from an interface portion that extends around the opening to the storage enclosure, selecting a sub woofer unit including an sub woofer box housing form fit to an interior of the storage enclosure, the sub woofer box housing having the a sub woofer speaker attached thereto, inserting the sub woofer assembly into the storage enclosure, attaching a speaker grill to the interface portion. In embodiments, the retrofit includes mechanically coupling the sub woofer unit to the enclosure at a plurality of sides of the sub woofer unit. In embodiments, a soft coupling is provided by adding a plurality of compressible foam spacers that extend between an exterior surface of the sub woofer box housing and an interior surface of the storage enclosure when the sub woofer assembly is installed in the storage enclosure. The foam spacers may be, for example, adhered to the exterior of the sub woofer box housing on some or all of the sides of the sub woofer box housing.

A feature and advantage of embodiments is that the storage enclosure in the recreational vehicle that is cooperatively sized for the sub woofer is in a center console below the dashboard.

A feature and advantage of embodiments, is that storage compartments in polymer structures, such as polymer body components, can be designed to be volumetrically sized for later installation of speaker units to provide a sealed speaker enclosure with the speaker of the speaker unit matched to the volume of the storage compartment.

In embodiments, a recreational vehicle, with storage compartments convertible to sealed speaker enclosures. Polymer body structures have speaker receiving receptacles with an enclosure portion having a cavity and a mounting interface that may receive a storage compartment cover, or a speaker unit. The storage compartment cover allowing access to the cavity and use as a storage compartment. The speaker units may include a speaker baffle assembly with a periphery conformingly sized to seat and seal on a shoulder of the enclosure portion at the mounting interface such that an enclosed and sealed speaker is formed utilizing the enclosure portion. The volume of the enclosure portion and the speaker matched for optimal performance. The speaker unit may be a sealed enclosure with a speaker therein conformingly sized to the cavity of the enclosure portion. A storage cover may be removed and the speaker unit inserted into the conformingly shaped storage enclosure with the speaker proximate the opening and pointed into the passenger area. A speaker grill may be removably inserted over the speakers facing the passenger area. The grill attachable to an interface portion on the storage enclosure or to the speaker baffle.

7

Figure 30:
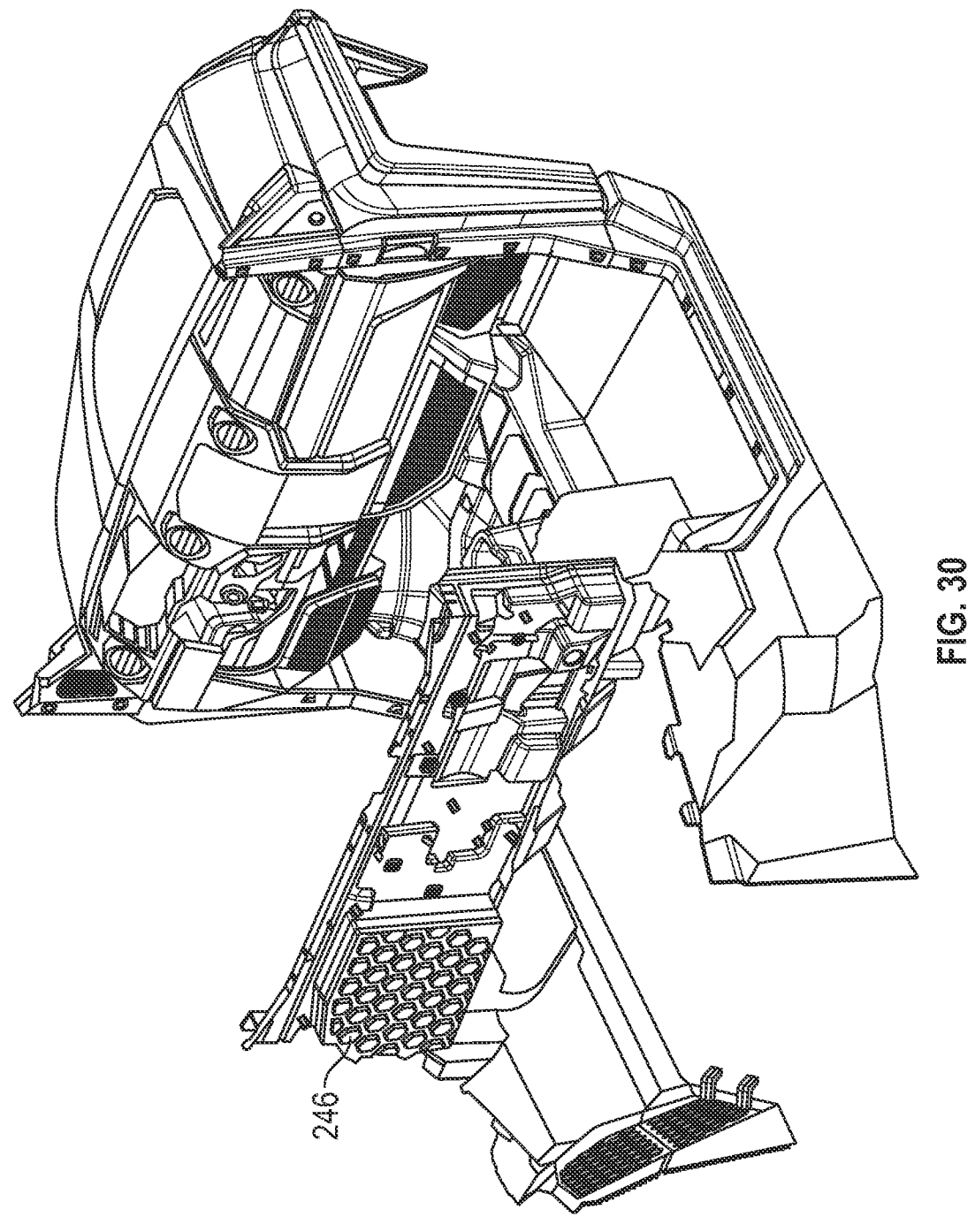

FIG. 30 is a view of portions of a recreational vehicle, including a close off panel behind the seating.

Figure 31:
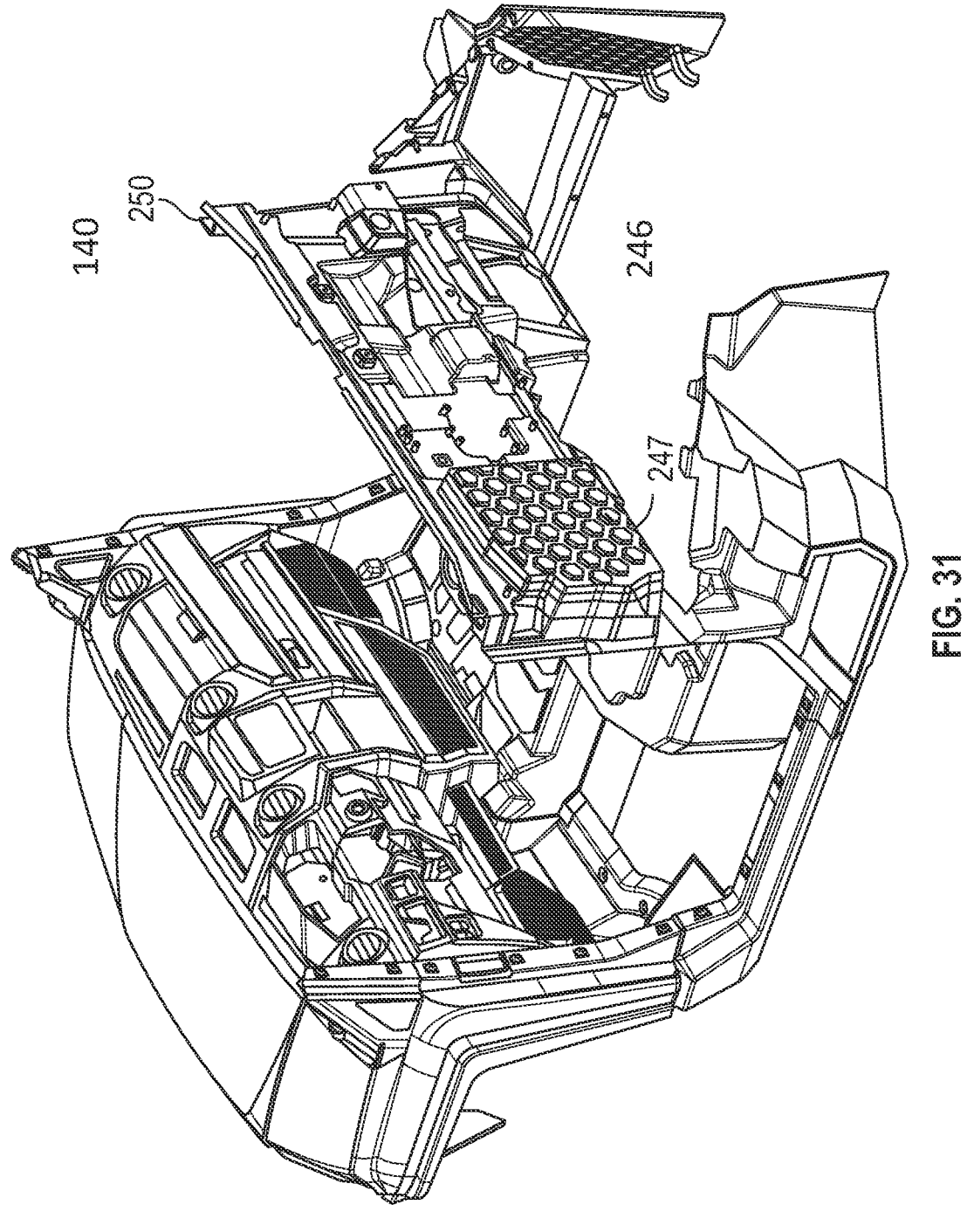

FIG. 31 is another view of the vehicle and close off panel of FIG. 30.

Figure 32A:
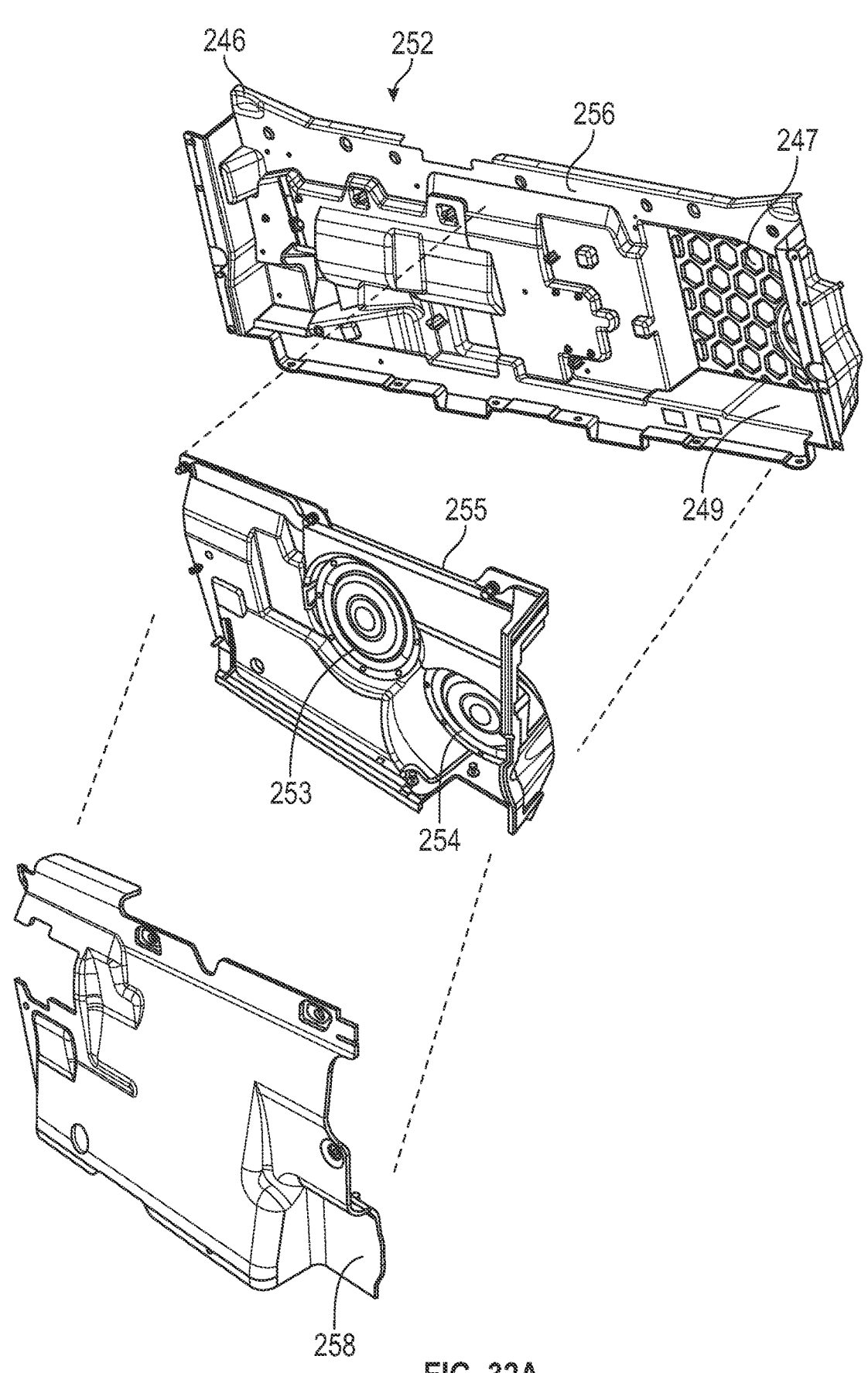

FIG. 32A is an exploded view of a storage enclosure behind a seat convertible to a speaker enclosure.

Figure 32B:
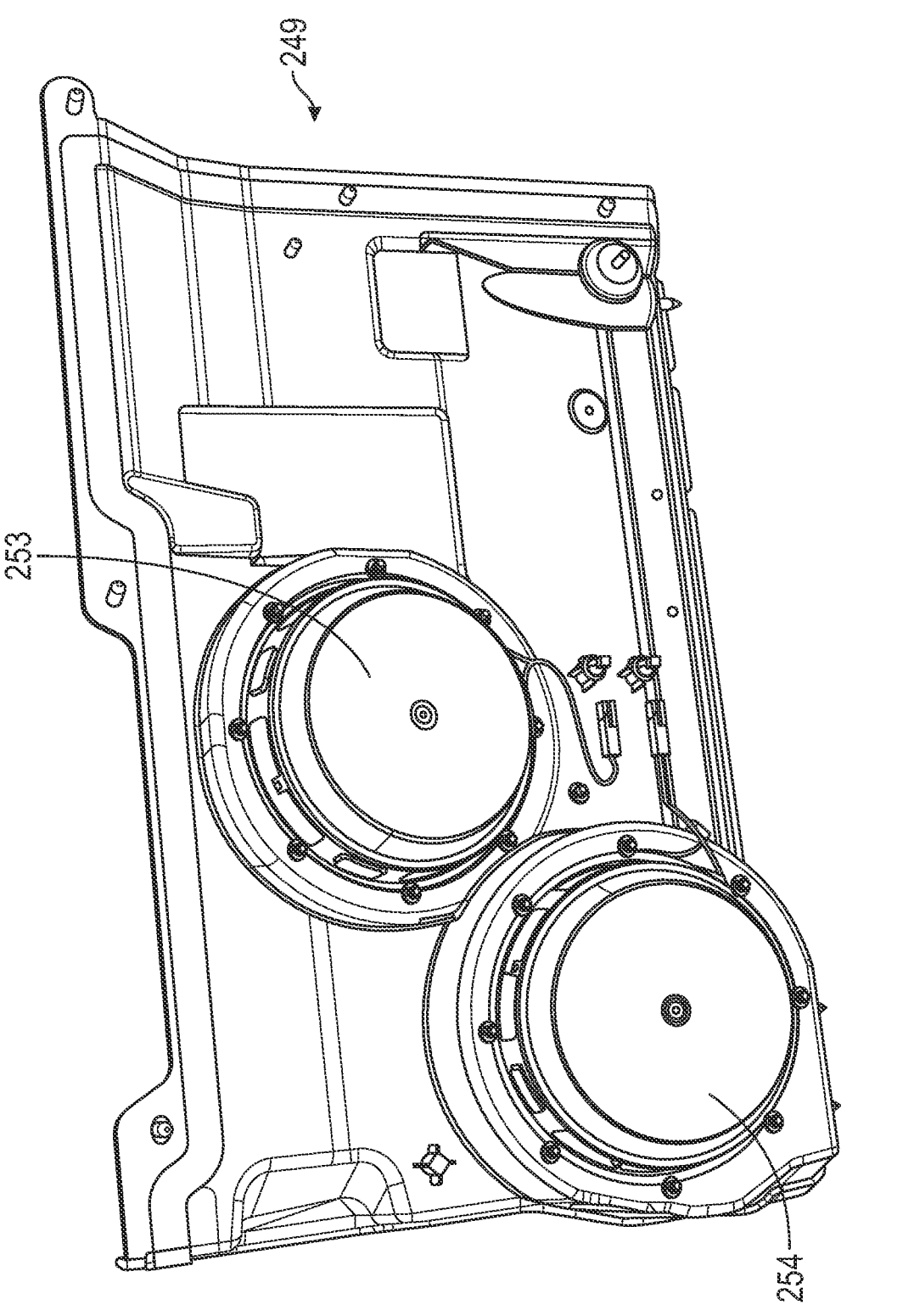

FIG. 32B is perspective view of the rearward side of the speaker baffle assembly with subwoofers of FIG. 32A.

Figure 32C:
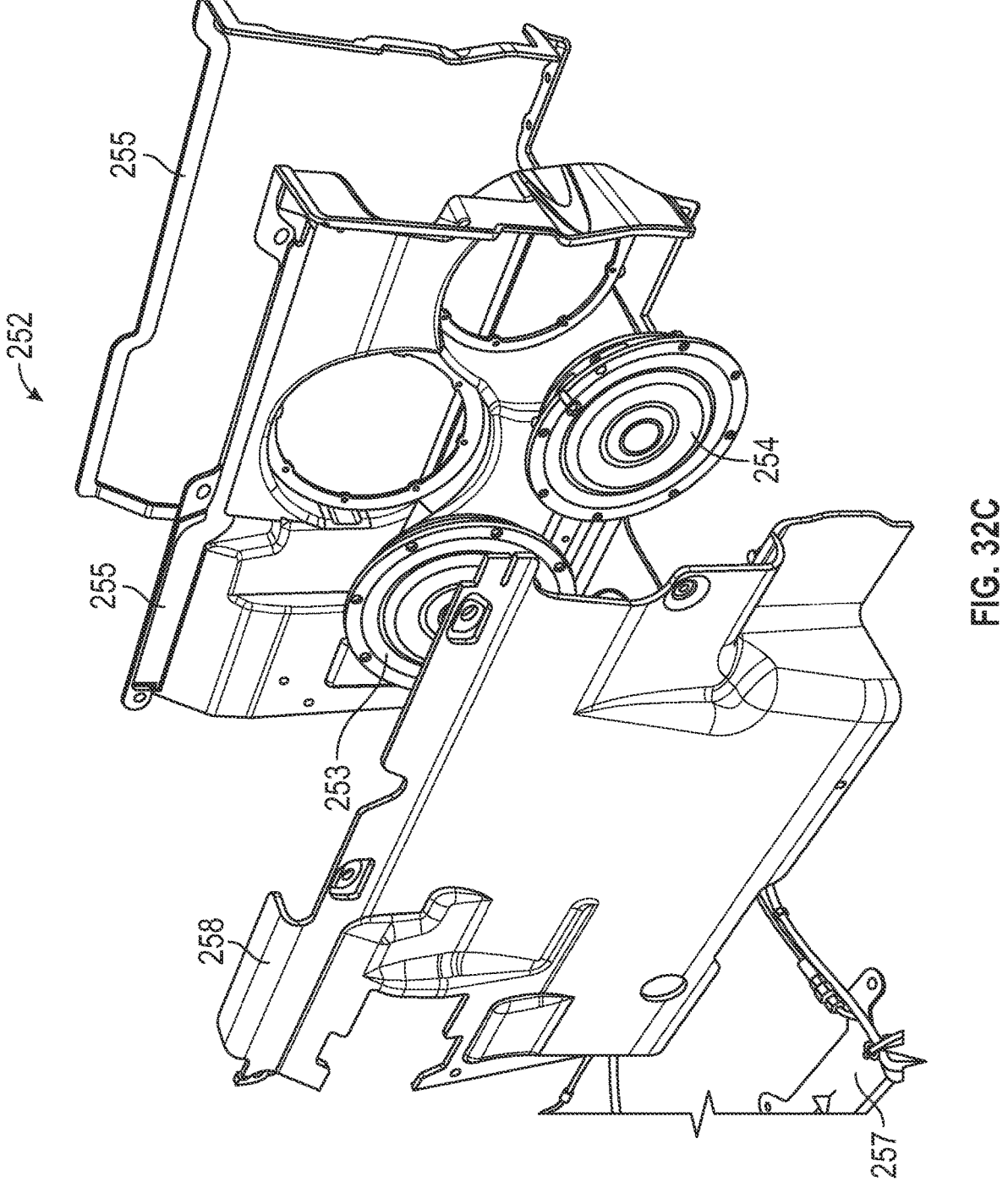

FIG. 32C is an exploded view of the speaker baffler assembly and a fibrous porous cover of FIG. 32A.

Figure 32D:
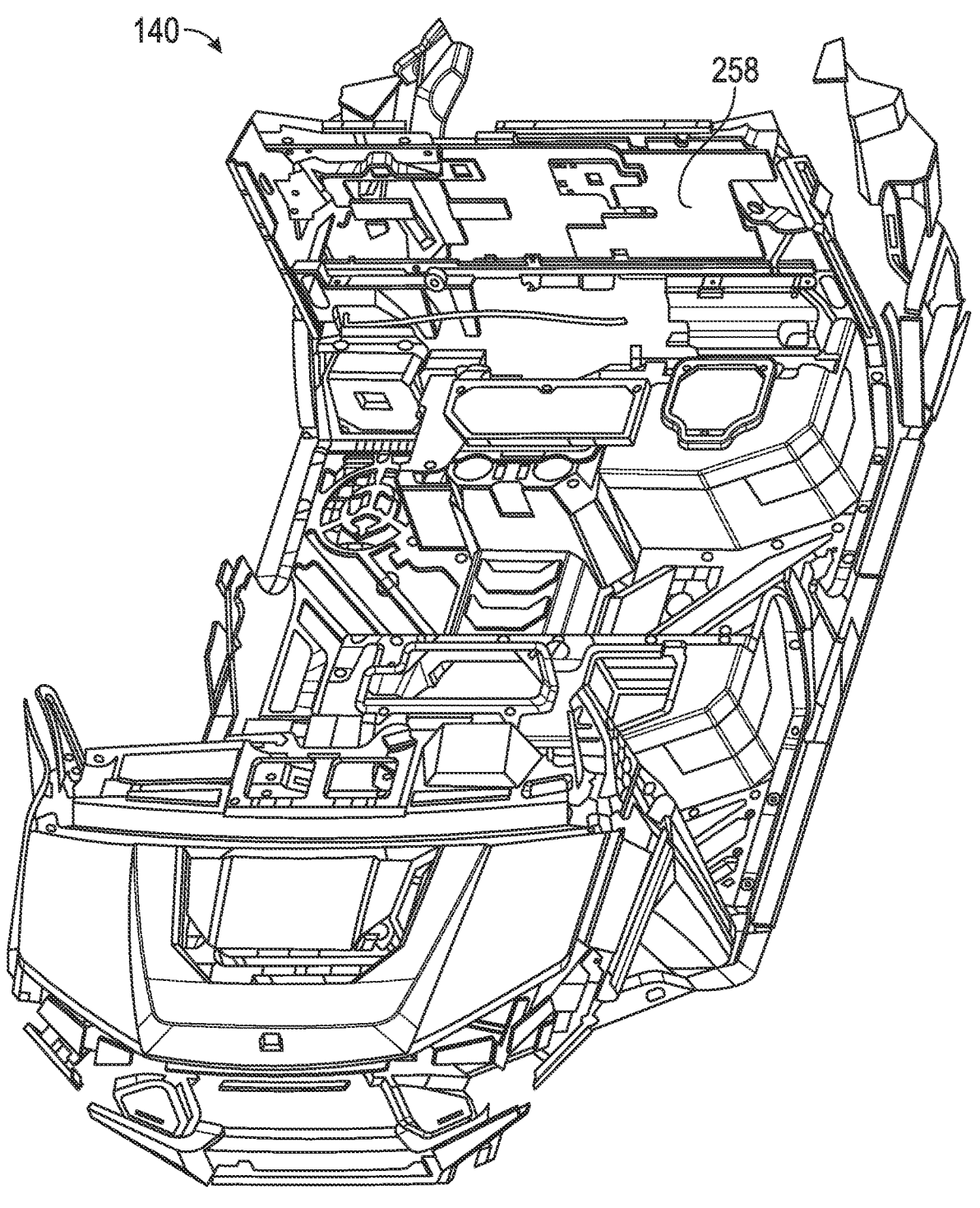

FIG. 32D is a perspective view of a side by side vehicle with the speaker baffle assembly of FIG.

Figure 33:
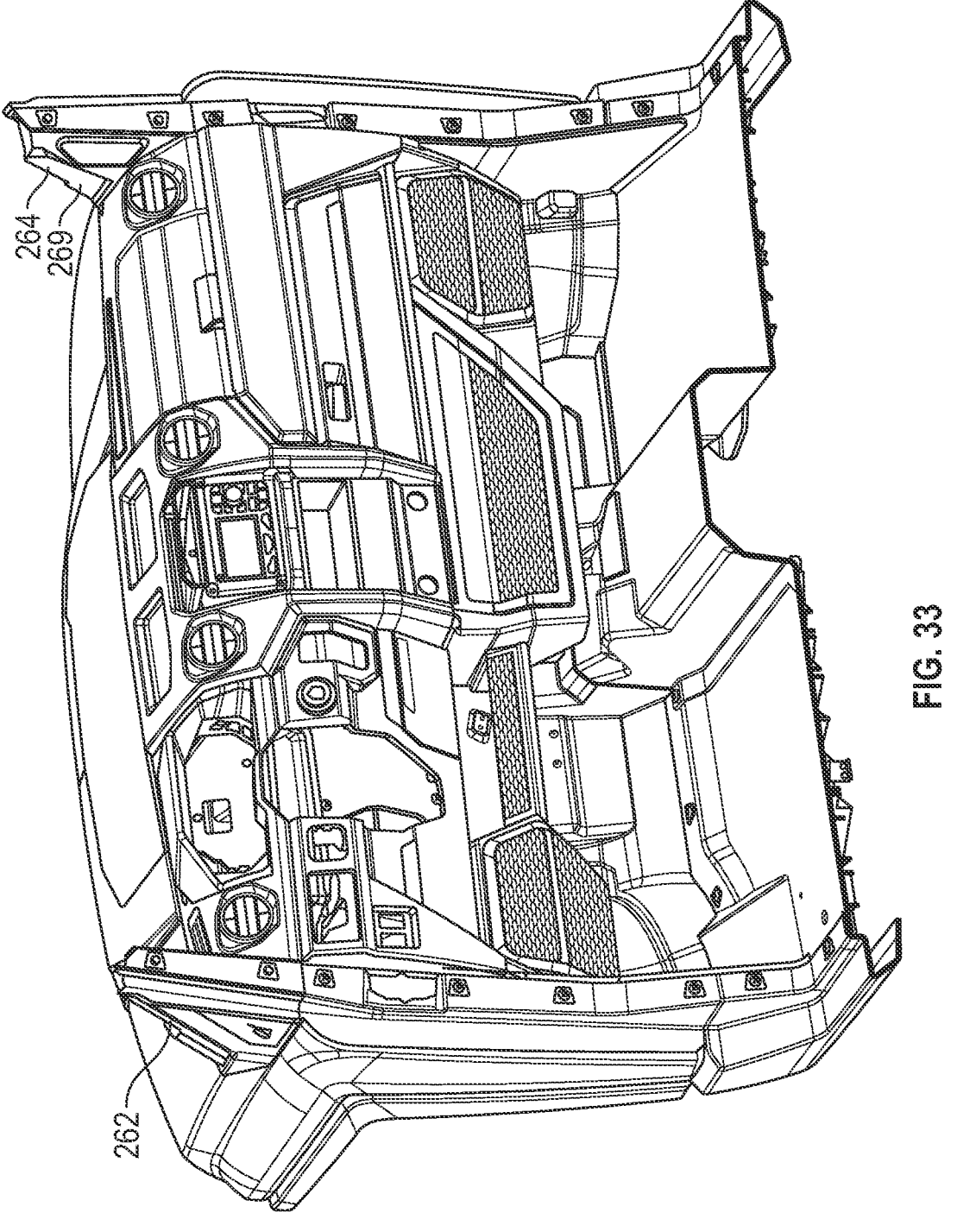

FIG. 33 is a dashboard of a recreational with A-pillars and tweeters mounted in the A-pillar moldings.

Figure 34:
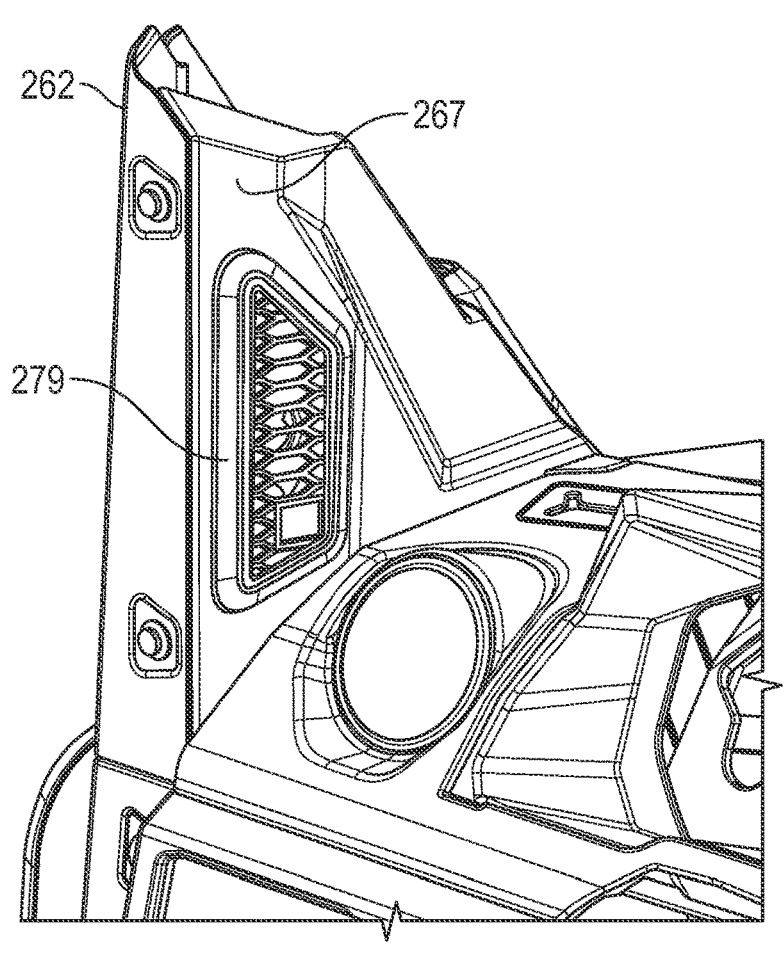

FIG. 34 is a detailed perspective view of the left A-pillar with a tweeter in place, covered by the grill.

Figure 35:
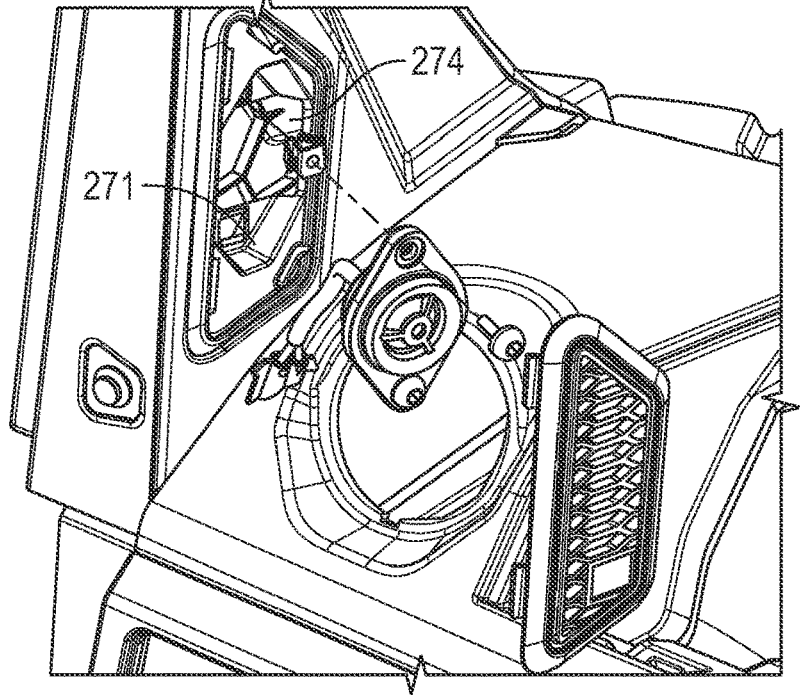

FIG. 35 is an exploded view with the grill and tweeter displaced from their seating locations in the speaker receiving receptacle.

Figure 36:
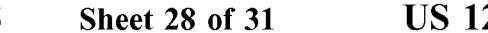

FIG. 36 is a perspective view of a forward portion of a recreational vehicle including a dashboard with a tweeter assembly mounted thereon.

Figure 37:
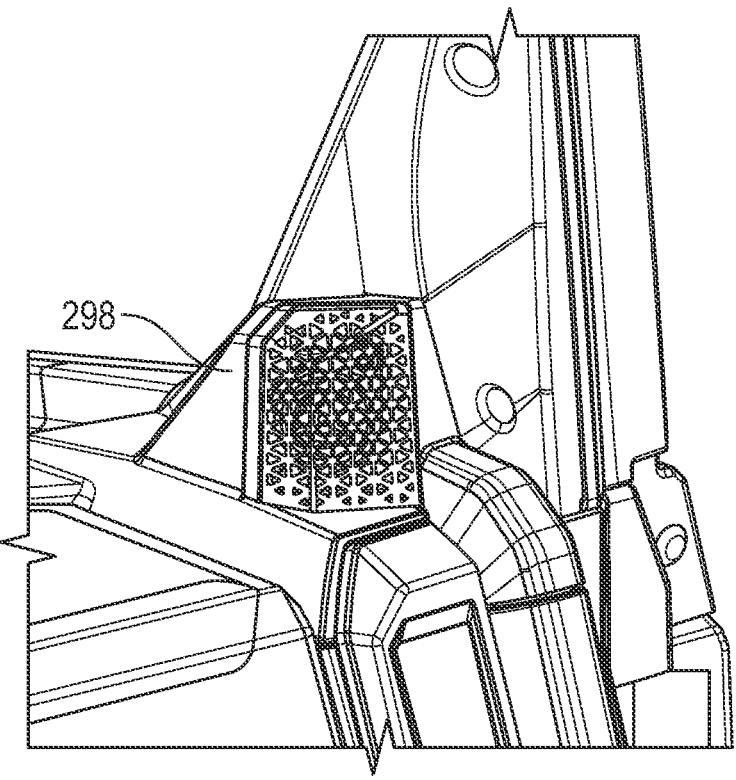

FIG. 37 is a perspective of a tweeter assembly on the right side of a dashboard of FIG. 36.

Figure 38:
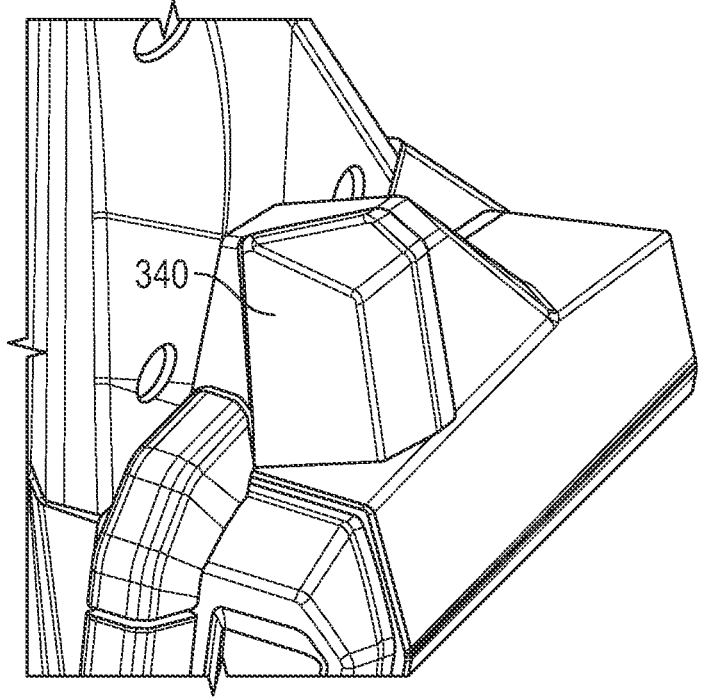

FIG. 38 is a view of a cover for a tweeter speaker receiving receptacle.

Figure 39:
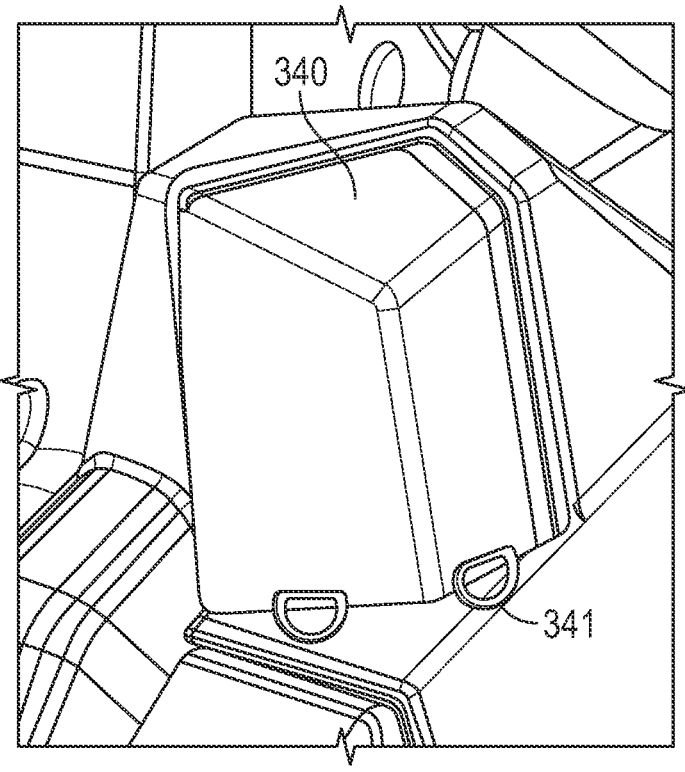

FIG. 39 is a perspective view of a cover for a tweeter speaker receiving receptacle.

Figure 40:
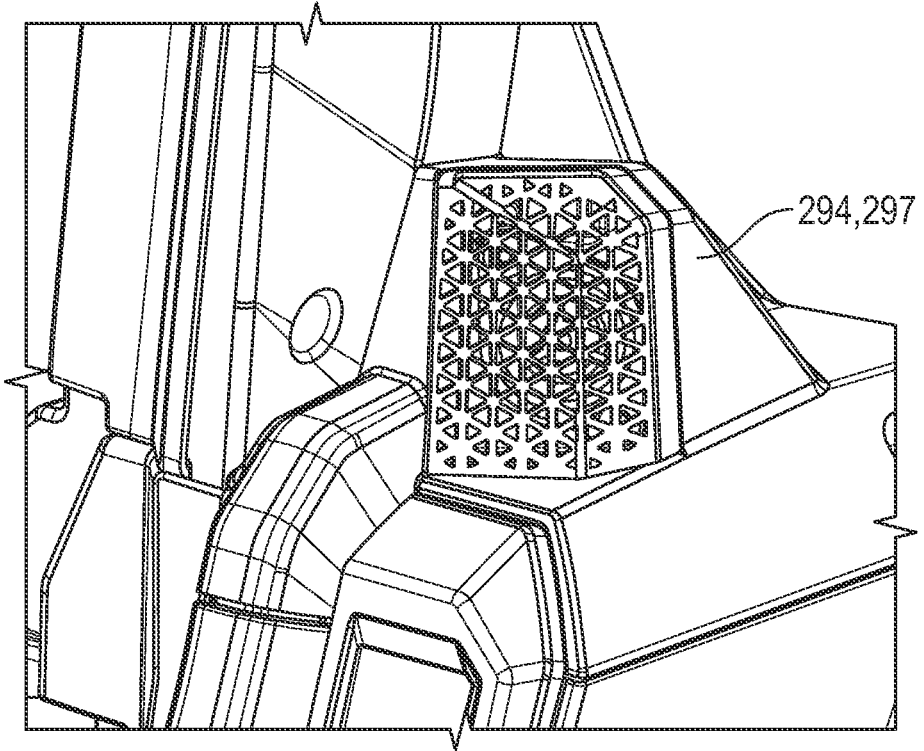

FIG. 40 is a detailed perspective view of a tweeter assembly on the dashboard of FIG. 36.

Figure 41:
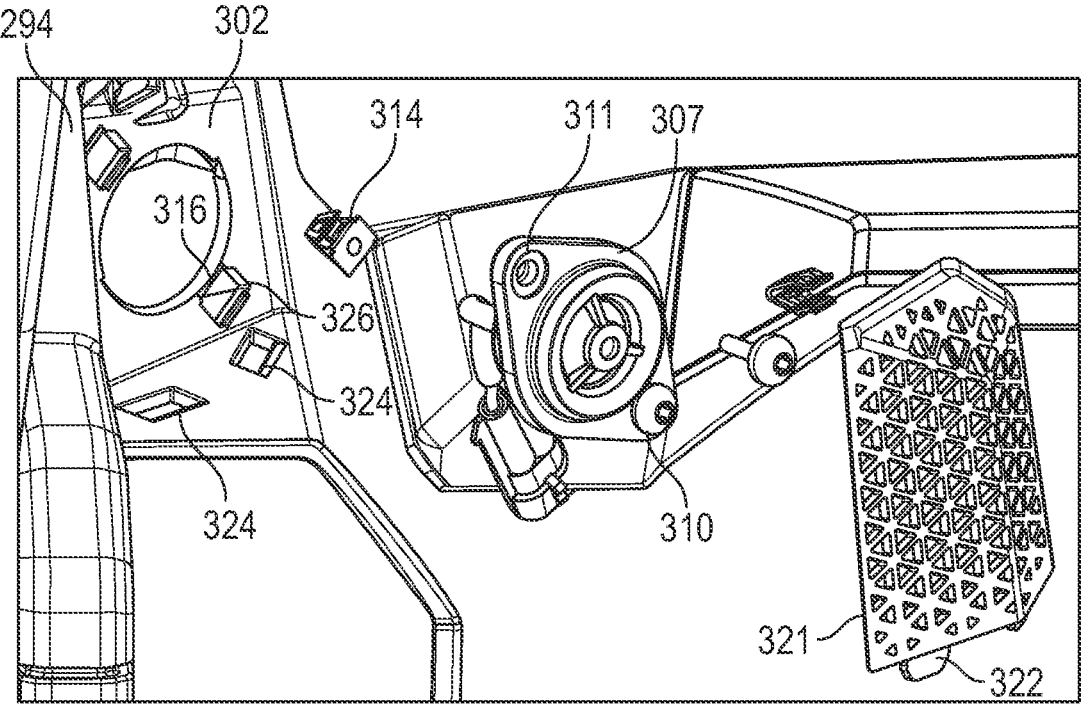

FIG. 41 is an exploded view of the tweeter assembly of FIG. 40.

DETAILED DESCRIPTION

Figure 1:
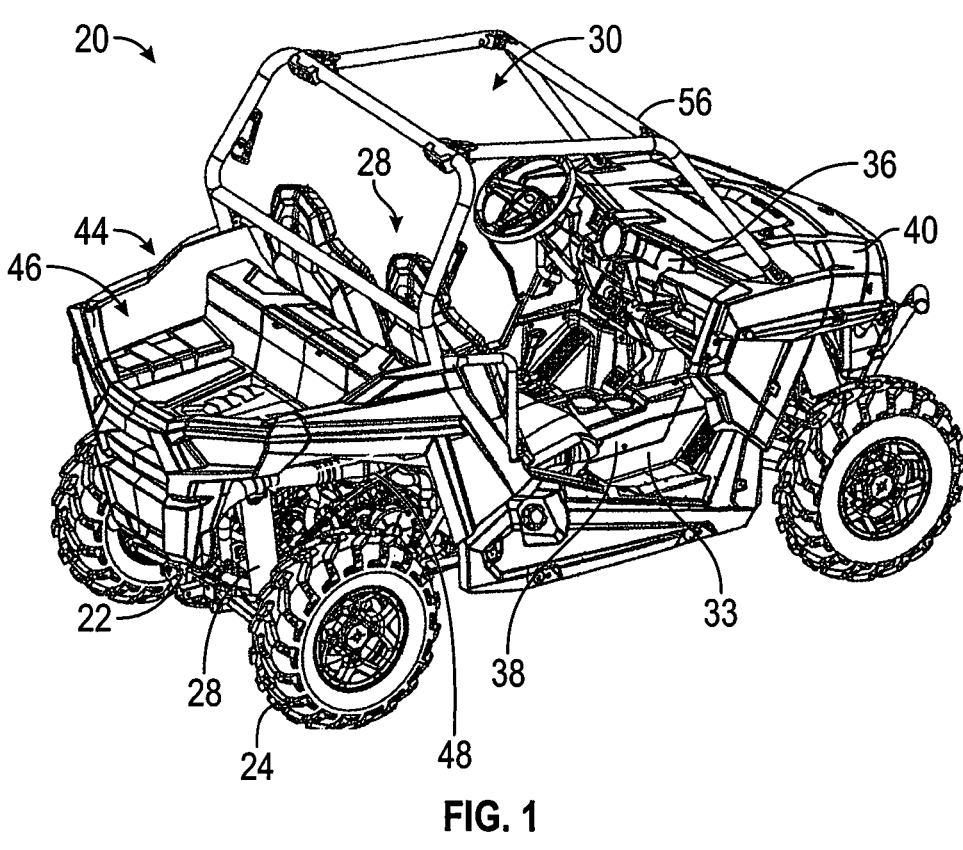
FIG. 1 is a perspective view of a recreational all terrain vehicle.
Figure 2:
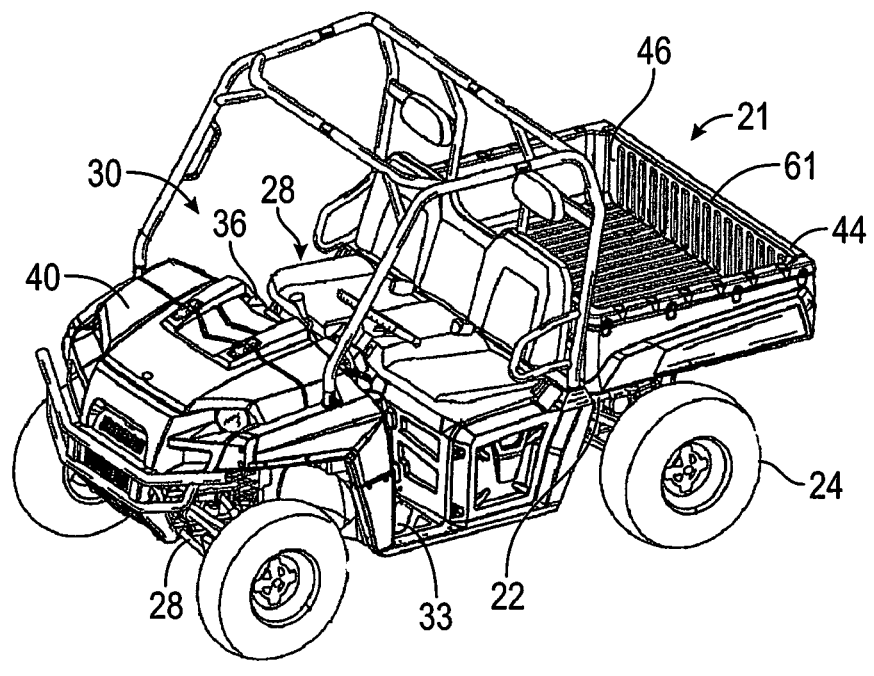
FIG. 2 is a perspective view of an off road utility vehicle.

Referring to FIG. 1, a recreational all terrain vehicle 20 is illustrated. FIG. 2 illustrates a recreational utility vehicle 21. The vehicles have side by side seating 28 in a passenger areas 30, the passenger area being generally open. Metal frames 22 supporting four wheels 24 by way of suspension systems 28, passenger area floor boards 33, dashboards 36, console 38, forward exterior body components 40, rearward beds 44 defining a cargo areas 46, and a motor 48. All the components are supported by and attached to, directly or indirectly, the frame. The passenger area 30 is generally defined by the dashboard 36, the side by side seating 28, and floorboards 33, and is covered by a roll cage 56.

Figure 3:
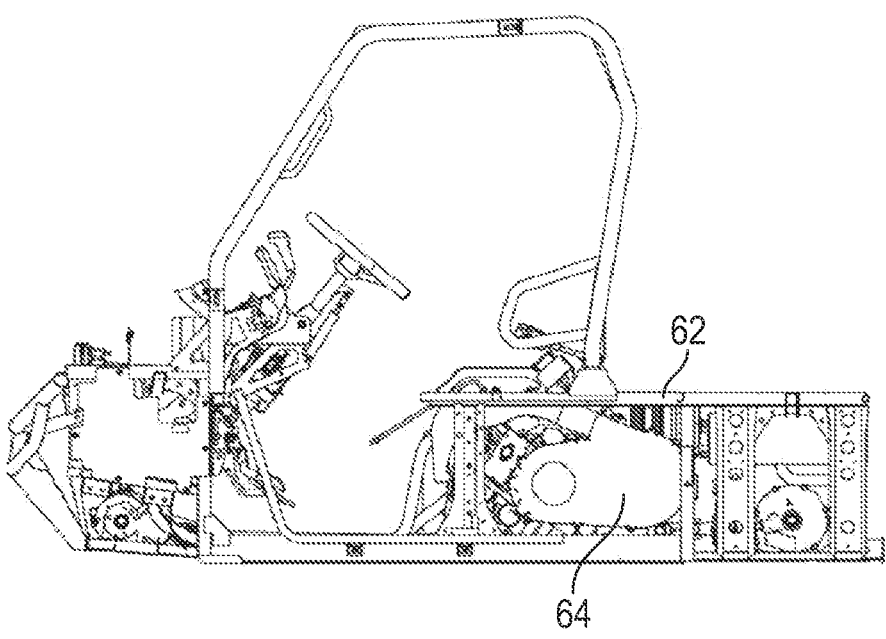
FIG. 3 is a side elevational view of a chassis or frame for the off road utility vehicle of FIG. 2.
Figure 4:
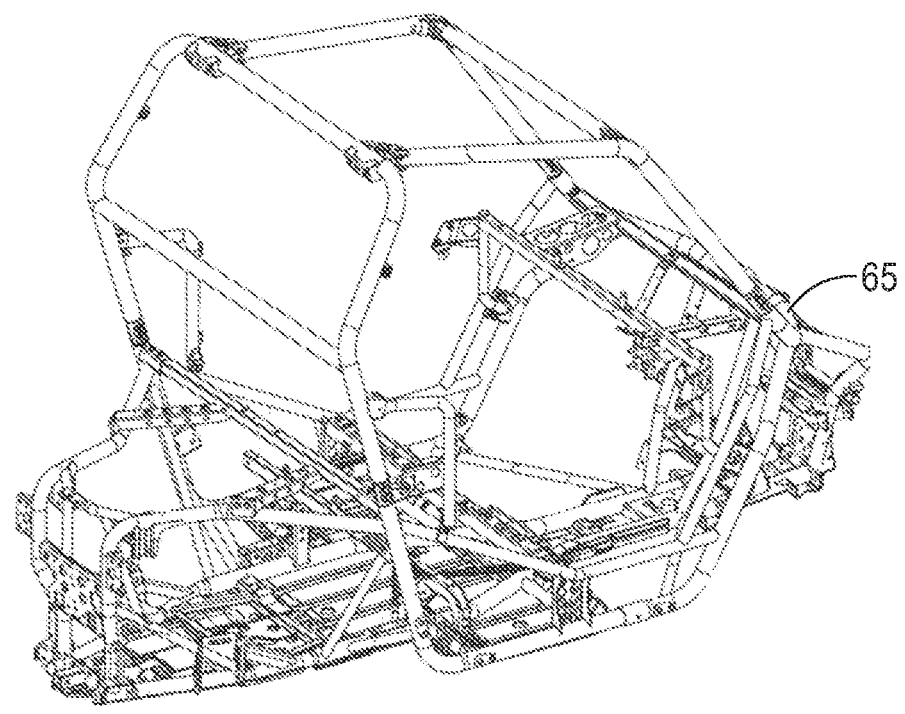
FIG. 4 is a perspective view of a chassis or frame for the recreational all terrain vehicle of FIG. 1

FIG. 3 illustrates an example chassis or frame 62 for a recreational utility vehicle such as shown in FIG. 2 and includes a motor 64. FIG. 4 illustrates a chassis or frame 65 for a recreational all terrain vehicle such as illustrated in FIG. 1.

Figure 5:
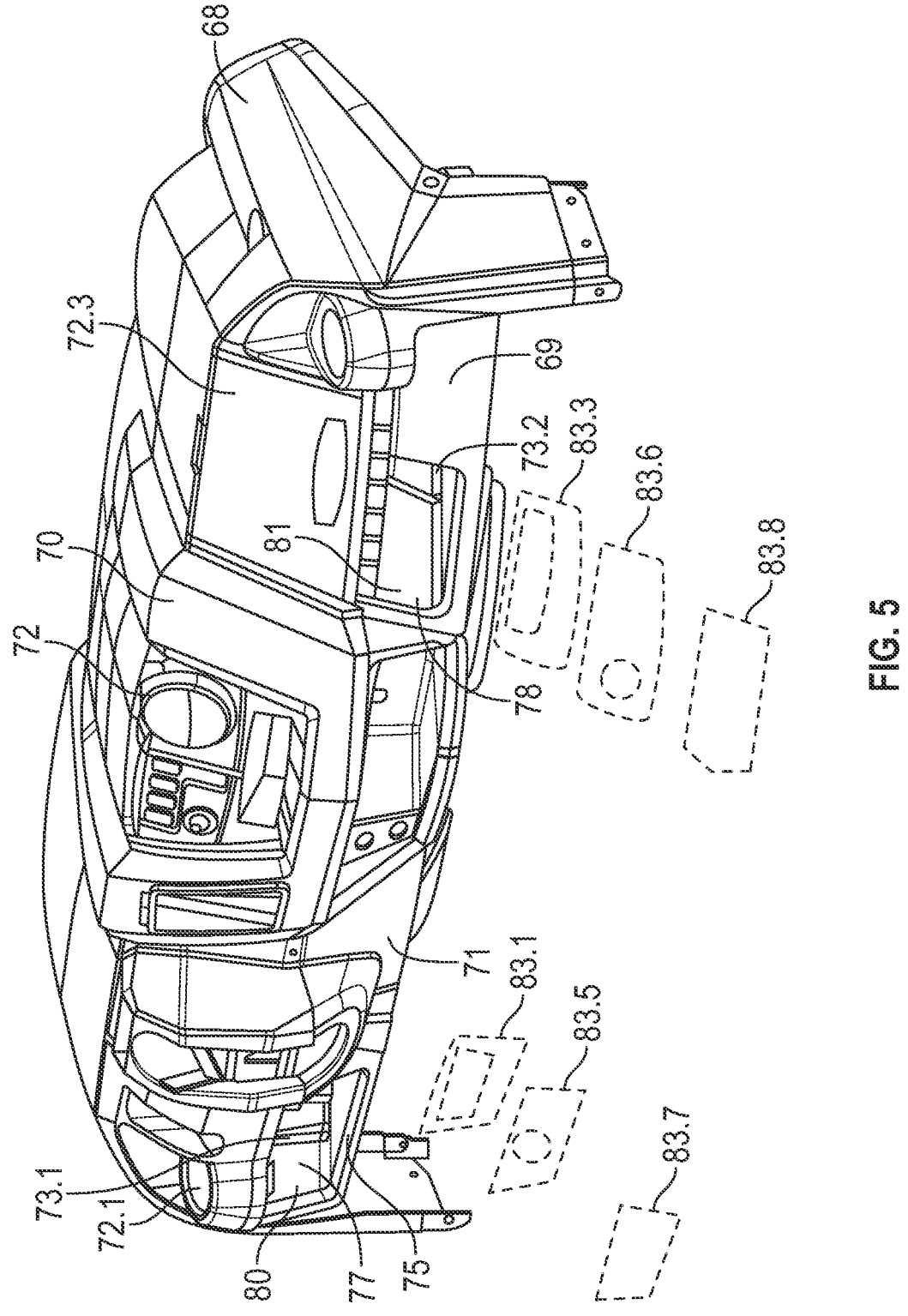
FIG. 5 Is a perspective view of an upper spanning dashboard member of the dashboard assembly of FIG. 4.
Figure 6:
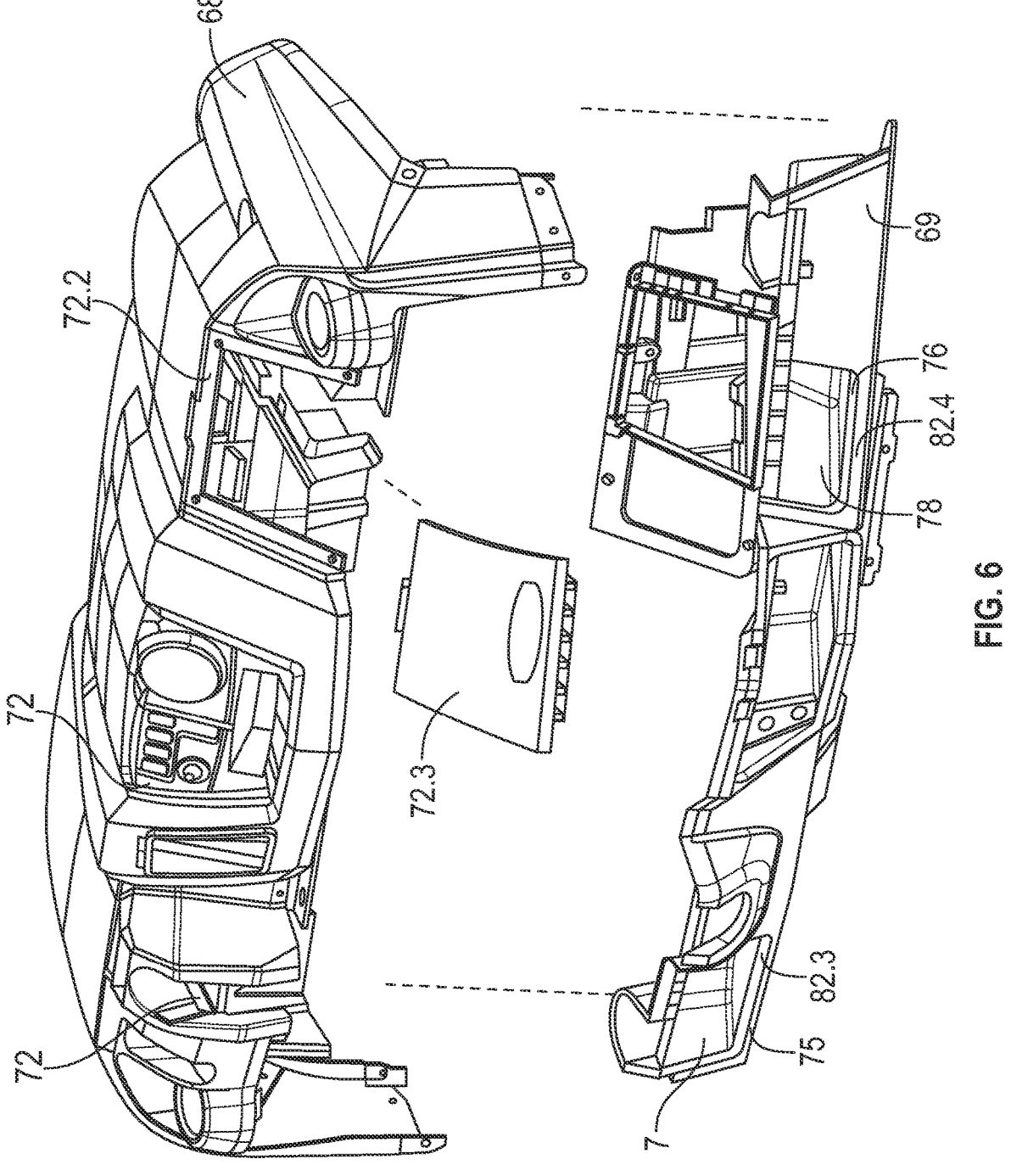
FIG. 6 is a perspective view of the lower spanning dashboard member of the dashboard assembly of FIG. 4.

Referring to FIGS. 5 and 6, a recreational vehicle dashboard assembly 66 that when installed spans the passenger area from side to side. The dashboard assembly 66 may include a plurality of molded polymer dashboard spanning members 68, 69 which each have an exposed polymer wall portion 70, 71 that face the passenger area and/or upwardly, and have various integral support structures 72 and openings associated with the dashboard equipment such as instrument panels, switches, vents, displays, cup holders 72.1 and a glove box 72.2 with door 72.3. The lower spanning dashboard member 69 include a pair of speaker receiving receptacles 73.1, 73.2 which include a pair of unitary enclosure portions 75, 76 defining cavities 77, 78. The enclosure portions each having openings 80, 81 facing rearwardly when installed in the vehicle, toward the passengers. Mounting interfaces 82.3 and 82.4 unitary with the enclosure portion receive, shown in dashed lines, alternatively storage covers 83.1, 83.3, or speaker units 83.5, 83.6. Speaker grills 83.7, 83.8 may attach to the speaker units. The storage covers may have access opening or may integrated doors as part of the storage cover. The storage enclosures may be positioned to be accessible to passengers seated in the side by side seating.

Figure 7:
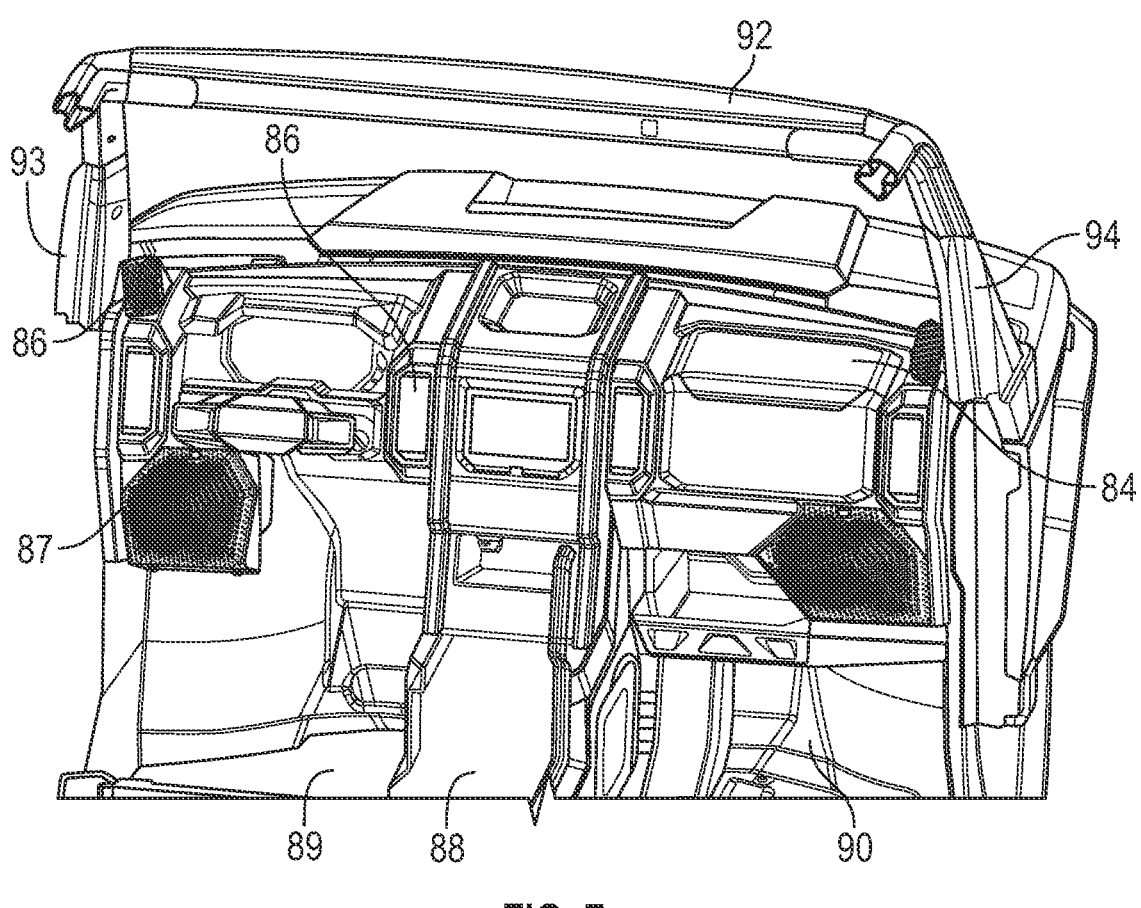
FIG. 7 is a perspective view of the forward passenger area of a recreational vehicle with a dashboard having a plurality of integrated speaker units.
Figure 8:
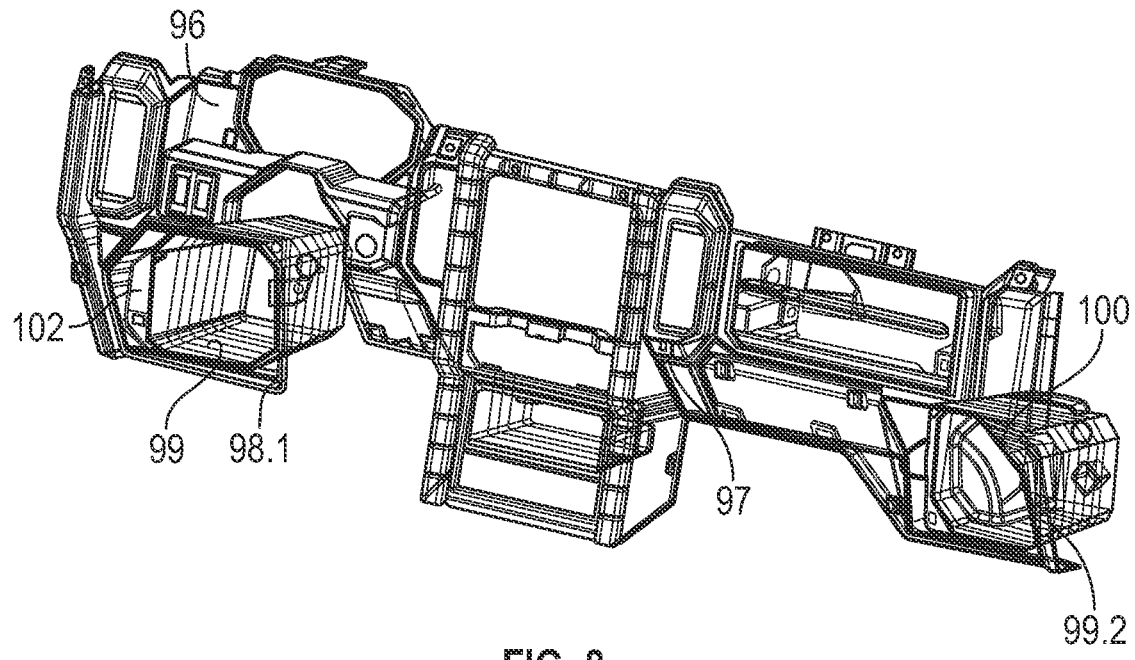
FIG. 8 is a perspective view of the lower spanning dashboard member of the dashboard assembly of FIG. 7.
Figure 9:
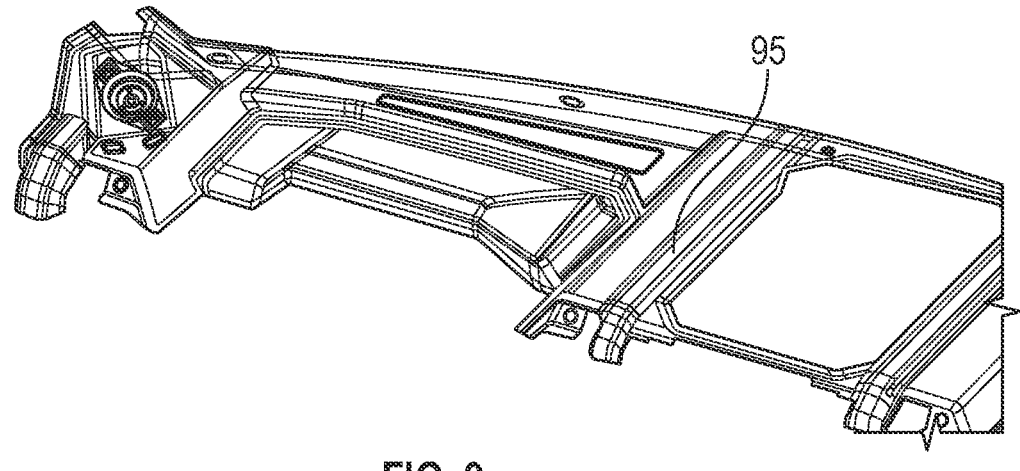
FIG. 9 is a perspective view of the upper spanning dashboard member of the dashboard assembly of FIG. 7.
Figure 10:
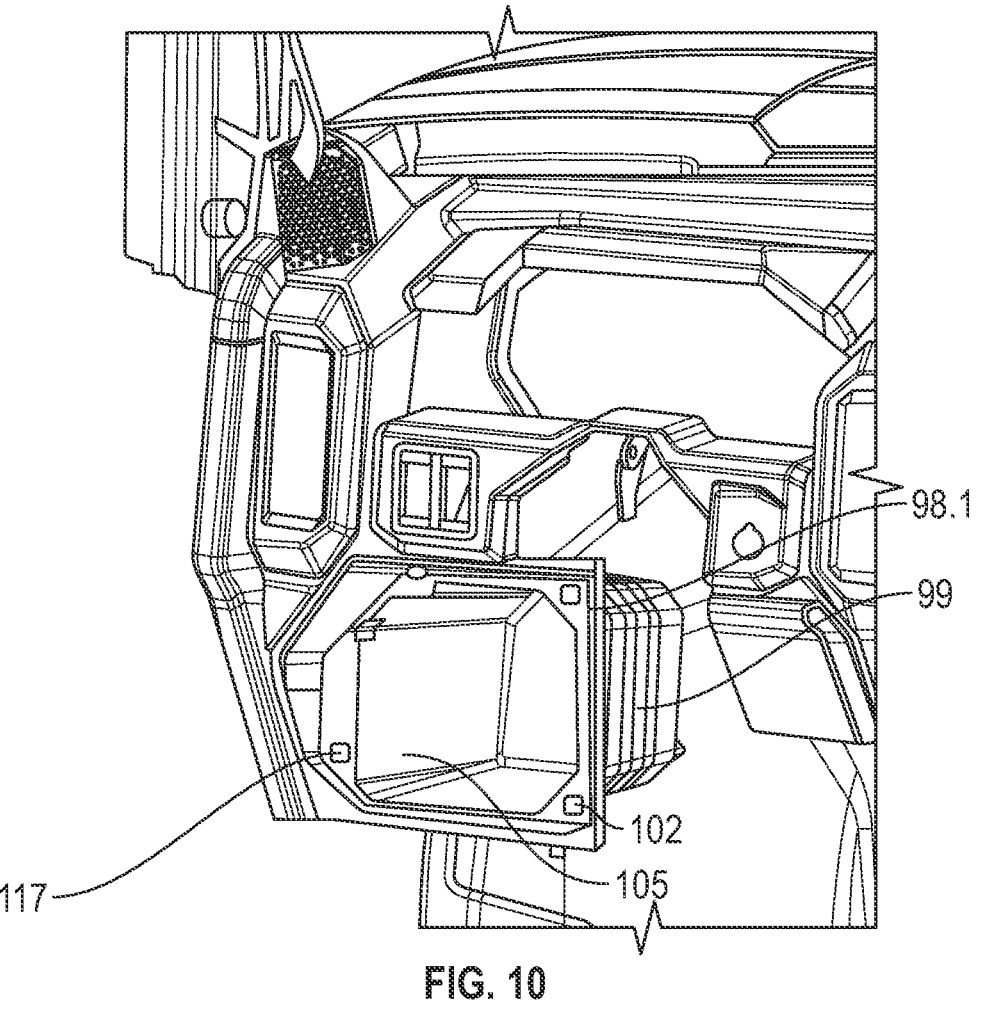
FIG. 10 is a perspective view of the left enclosure portions with the mounting interface portion of the dashboard of FIG. 7.
Figure 11:
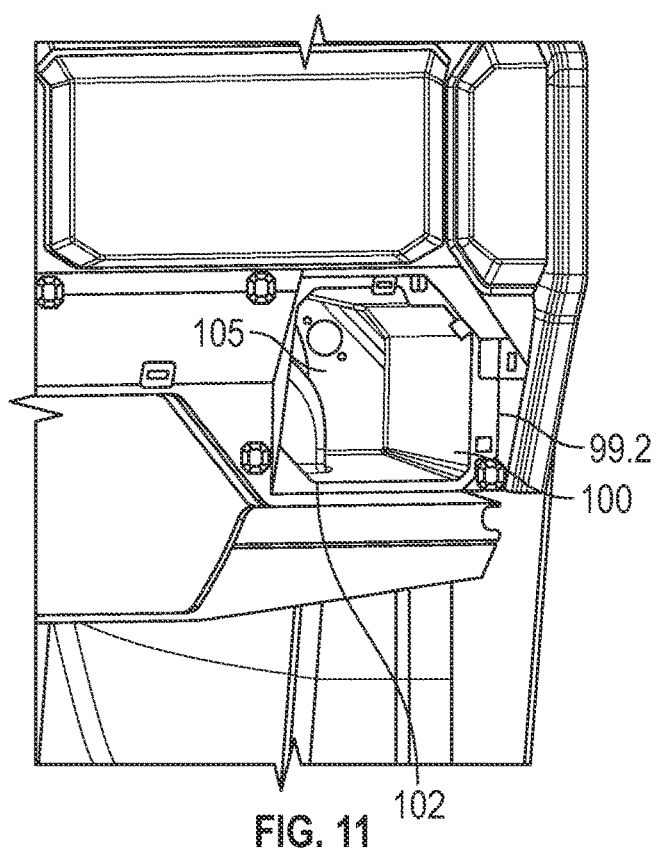
FIG. 11 is a perspective view of the right enclosure portion with the mounting interface portion of the dashboard of FIG. 7.
Figure 12:
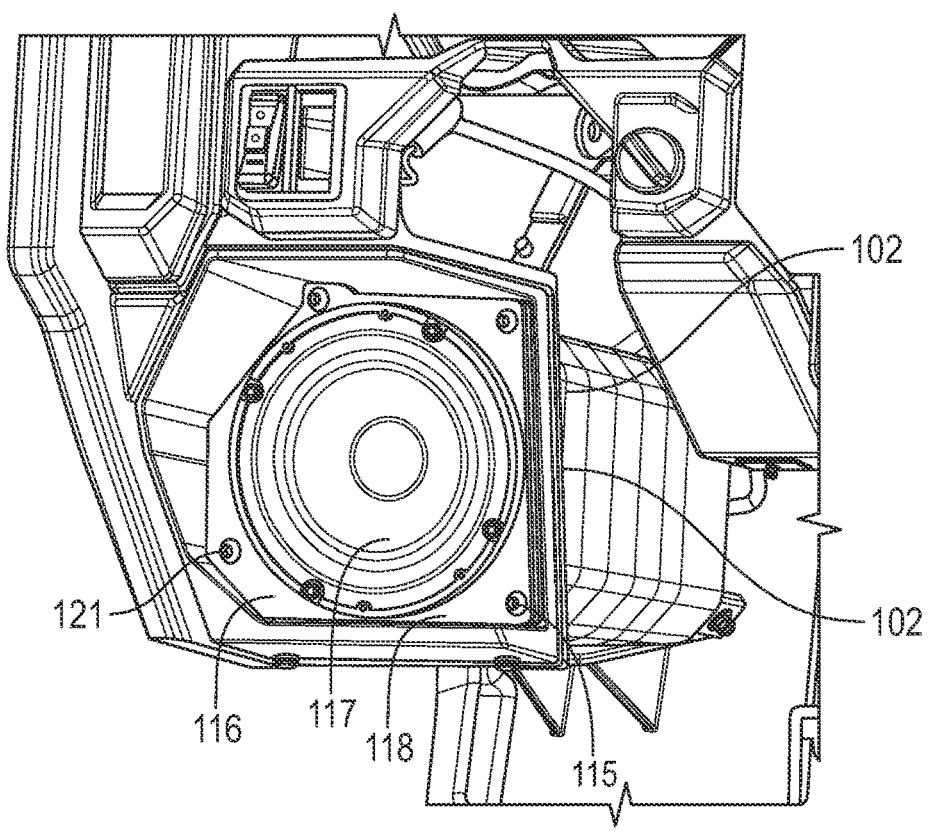
FIG. 12 is a perspective view of a speak unit with a baffle and speaker mounted to the mounting interface portion of the dashboard of FIG. 7.
Figure 13:
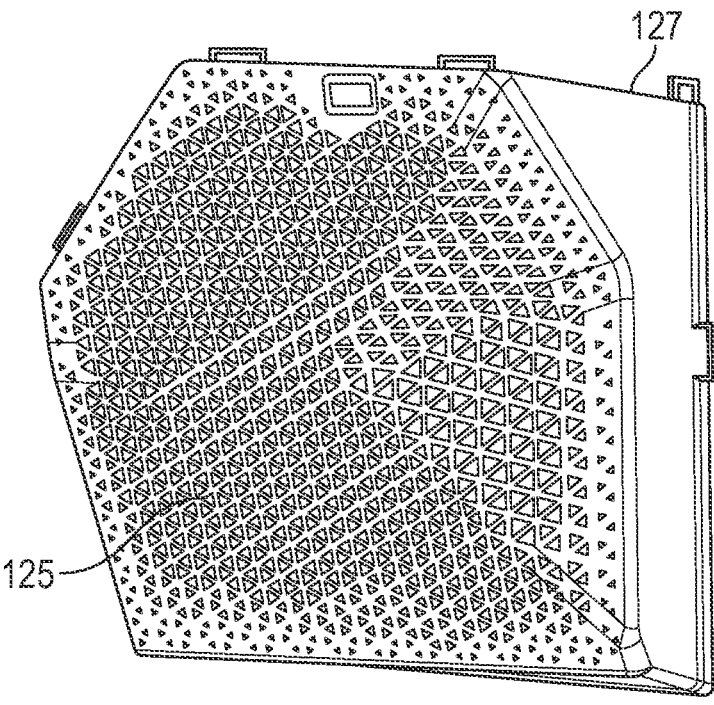
FIG. 13 is a perspective view of the speaker grill with mounting tabs.
Figure 14:
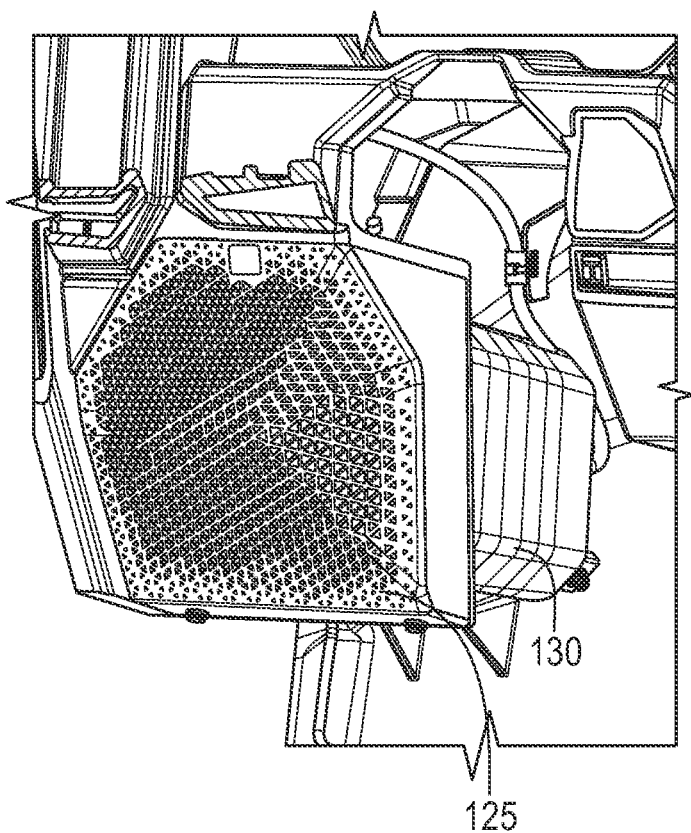
FIG. 14 is a perspective view of the enclosure portion with speaker baffle unit of FIG. 12 with the speaker baffle mounted to the mounting interface portion.

Referring to FIGS. 7, 8, and 9 the forward margin of the passenger area of a side by side vehicle is defined by a dashboard assembly 84 having a pair of upper tweeter speakers 86 and a pair of lower midrange speakers 87. The forward margin of the passenger area is further defined by a console 88 connecting to the dashboard assembly, forward floor boards 89, and forward walls 90. A roll cage 92 includes a pair of A-Pillars 93, 94 with the pair of tweeters 86 adjacent thereto. The dashboard assembly 84 having an upper molded polymer spanning dashboard member 95, and a lower molded polymer dashboard spanning member 96. The lower spanning member 96 has a wall portion 97 and further has a left speaker receiving receptacle 98.1 with a left enclosure portion 99 and a right speaker receiving receptacle 99.2 with an enclosure portion 100 as best shown in FIGS. 8, 10, and 11. Each enclosure portion includes a mounting interface portion 102 at the opening 105 facing the passenger area. As described more fully below, the enclosure portions are convertible from a storage mode to an audio mode.

Figures 15, 16:
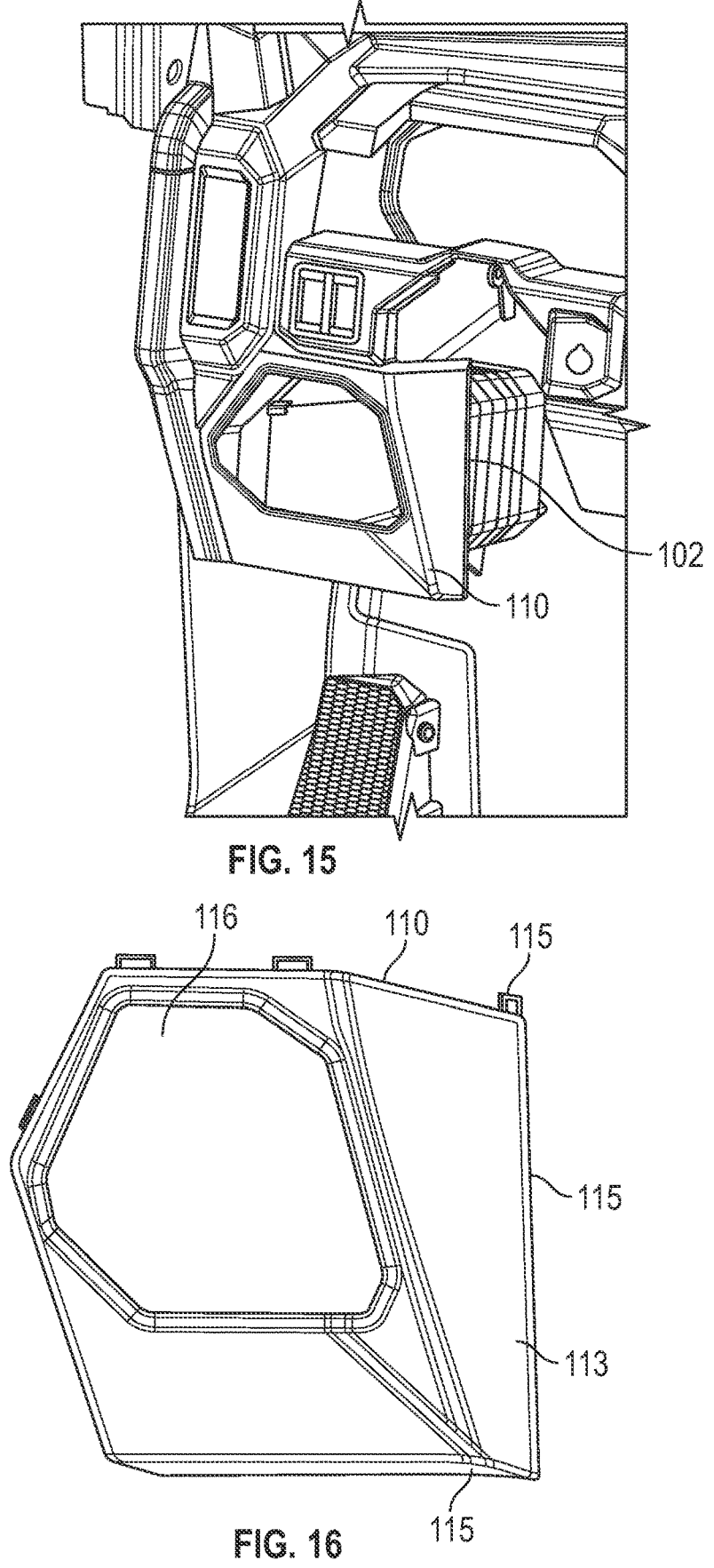
FIG. 15 is a perspective view of the left enclosure portion of FIG. 4 with a storage cover mounted to the mounting interface portion.
FIG. 16 is a detailed perspective view of the storage cover of FIG. 15 illustrating the tabs.

Referring to FIGS. 10, 15 and 16, the enclosure portions at the mounting interface portions 102 receive a storage enclosure cover 110 that has a forward periphery 113 with connection tabs 115 and an access opening 116 spaced from the periphery 113. The tabs 115 engage cooperating recesses or slots 117 on mounting interface 102 of the enclosure portion 99 putting the enclosure portion in the storage mode.

Referring to FIGS. 10, 12, 13, and 14, the storage enclosure cover 110 may be removed and a speaker unit 115 configured as a speaker baffle 115 including a baffle panel 116 with a central opening with a speaker 117 therein and mounted to the baffle panel. The baffle panel 116 having a periphery 118 conforming to the mounting interface 102 with mounting holes to receive threaded fasteners 121 that extend through the speaker baffle panel and into the interface portion 102 of the enclosure portion. Sealing material may be sandwiched between the speaker baffle and the interface portion such that a sealed speaker enclosure is formed. A speaker grill 125 having tabs 127 is attachable to the mounting interface portion at the same slots that received the tabs of the storage cover 115. With the speaker baffle 115 installed to the enclosure and the grill 125 attached, the enclosure portion has been converted from what was a storage enclosure to the audio mode with a sealed speaker enclosure 130. The volume of the sealed cavity in the enclosure portion can range from about 2 liters to about 6 liters, depending on the size of the speaker. The geometric configurations of the left and right enclosure portions may be different but in embodiments the respective volumes with be within 0.5 liters of each other. In embodiments, the difference between the respective volumes will be no more than 10 percent of the larger of the two volumes. More specifically, in embodiments, if the speaker of the speaker baffle is a 6½ inch speaker, the volume of the sealed cavity in the enclosure portion may be in the range of 3 to 6 liters. In embodiments where the speaker is a 4 inch speaker, the volume of the sealed cavity in the enclosure portion may be in the range of 2½ to 4 liters. In embodiments where the speaker is a 5¼ inch speaker, the volume of the sealed cavity in the enclosure portion may be in the range of 2¾ to 4½ liters.

Figure 17:
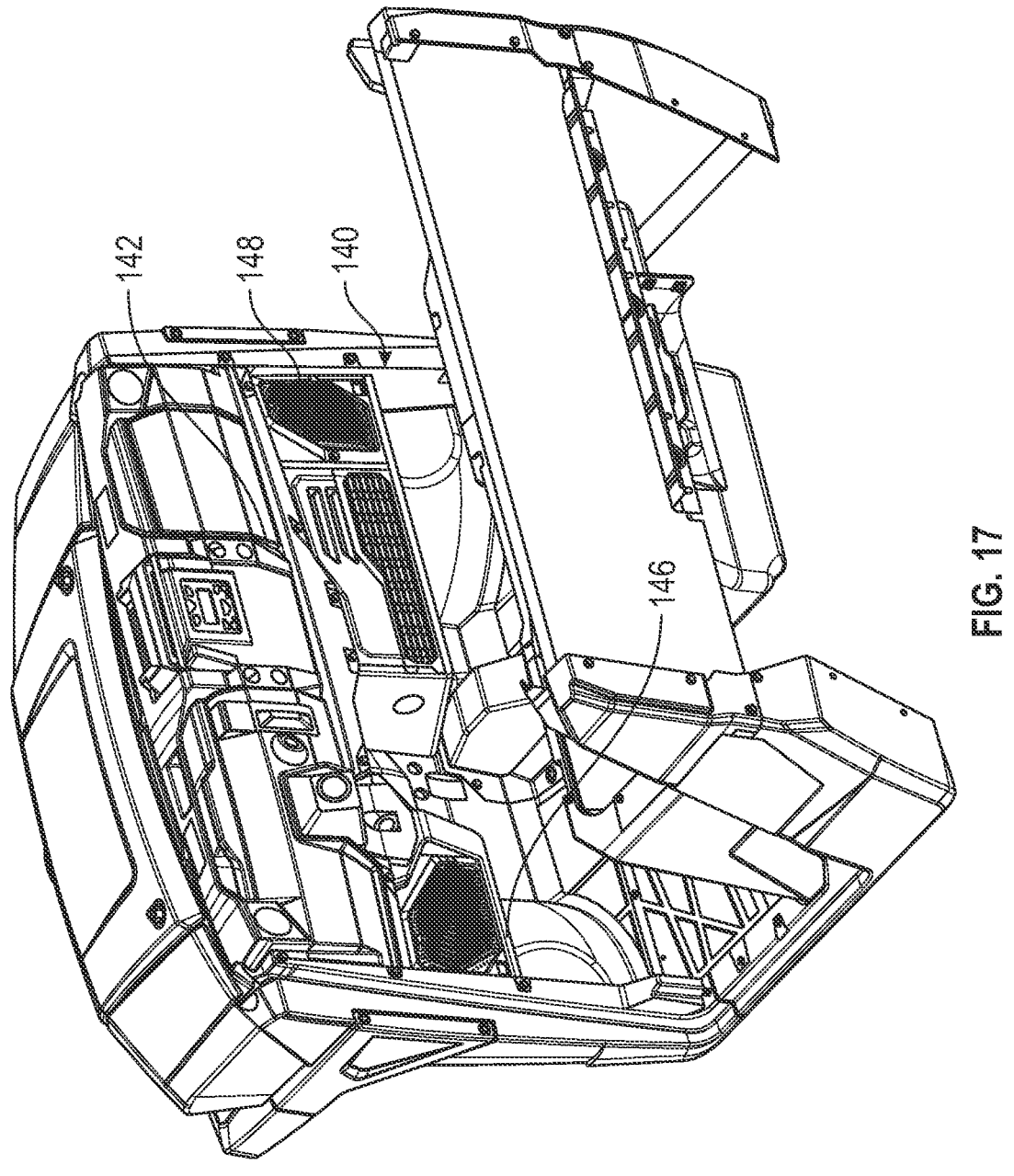
FIG. 17 is a perspective view of another passenger area of a recreational vehicle with the dashboard assembly having a enclosure portions that may be configured as a storage compartment and is currently configured as shown as a sealed speaker enclosure.
Figure 18:
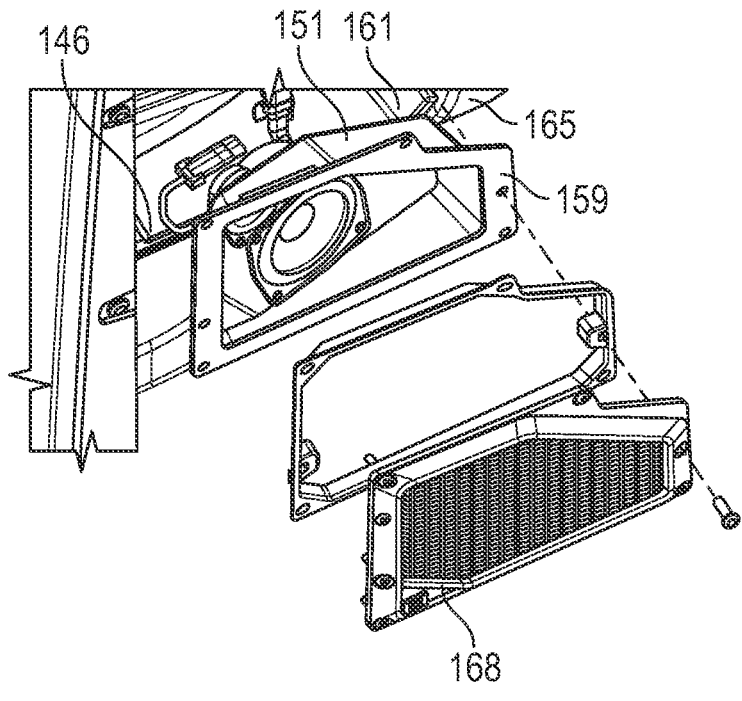
FIG. 18 is an exploded view of the speaker unit of FIG. 17 showing the baffle, a peripheral seal, a grill and a speaker baffle.
Figure 19:
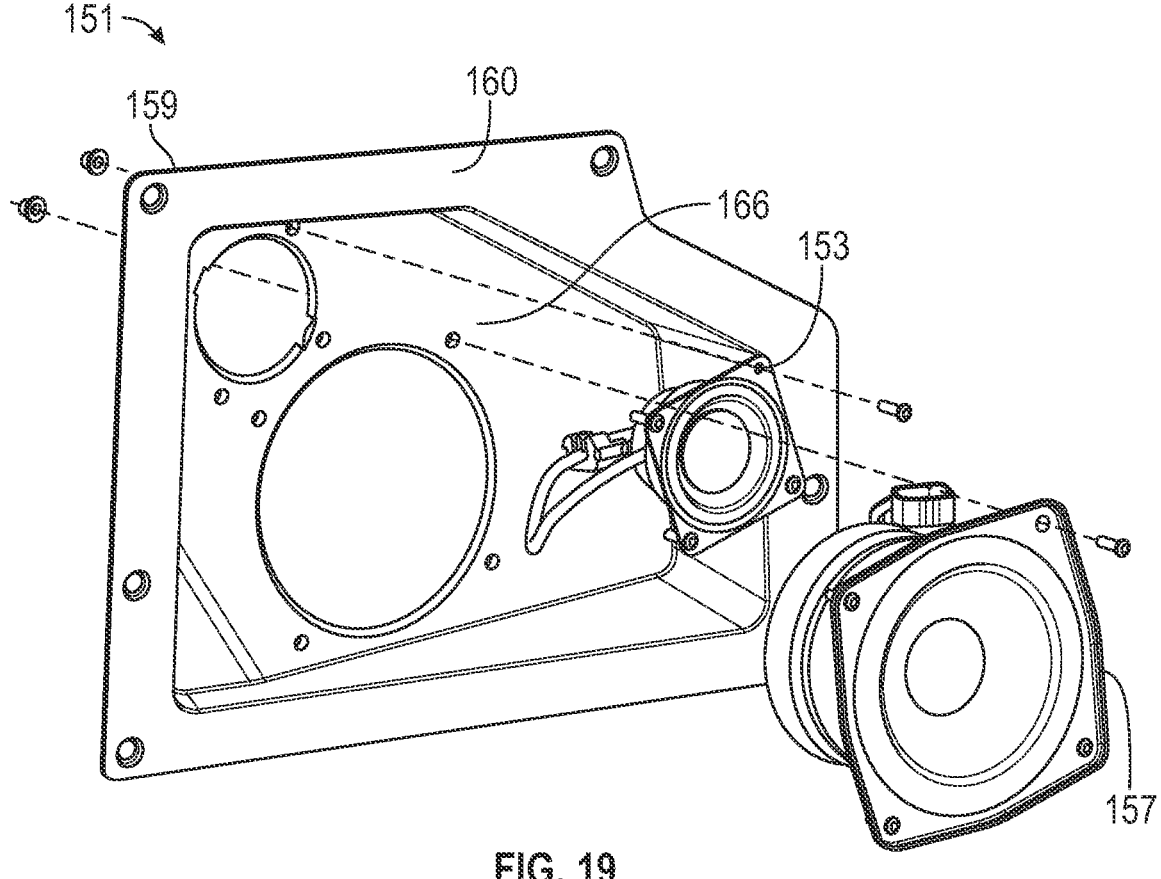
FIG. 19 is an exploded view of the baffle and speaker assembly of FIGS. 17 and 18.

Referring to FIGS. 17-19 an embodiment of a recreational vehicle having a passenger area 140 rearward of a dashboard assembly 142 that has a pair of speaker receiving receptacles configured as integrated enclosure portions 146, 148 that each receive a baffle 151 with a tweeter 153 and a midrange speaker 157 mounted thereto. The baffle having a periphery 159 with a planar peripheral portion 160 that may be received by a cooperating flat surface 161 on the mounting interface 165 of the enclosure portion. The tweeter and midrange speakers are both mounted to panel portion 166 of the baffle 151 that is recessed forwardly with respect to the planar peripheral portion and provided with a desired angle so that the tweeter may be advantageously aimed, for example at seated passengers while the mounting interface portion may be near vertical. The baffle may be covered by a grill 168.

Figure 20:
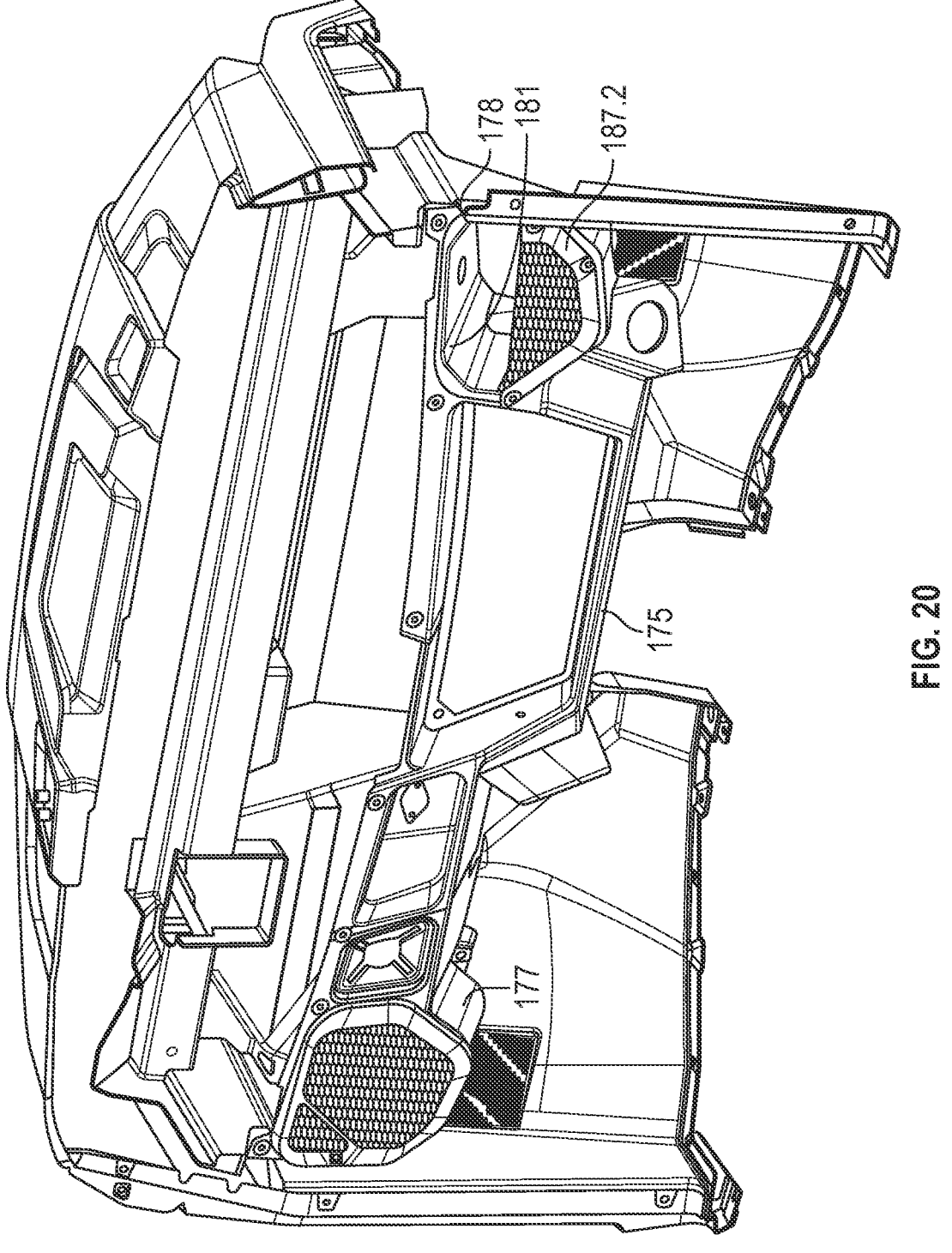
FIG. 20 is a perspective view of a mounted lower spanning polymer dashboard member with a pair of storage-speaker enclosures, one with a speaker assembly and one with a storage area.
Figures 21, 22:
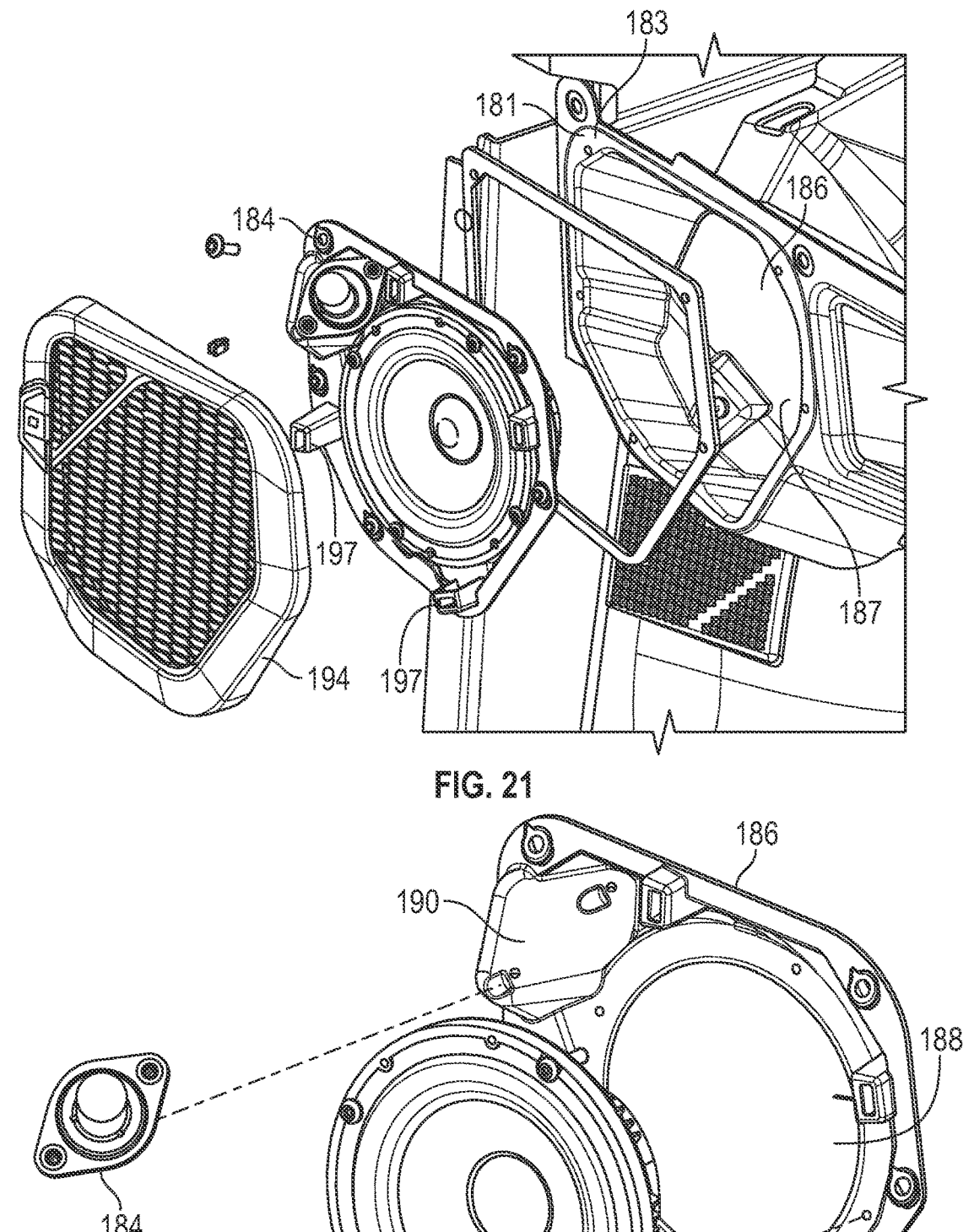
FIG. 21 is an exploded view of the speaker assembly shown in FIG. 20.
FIG. 22 is an exploded view of the baffle and speakers of FIGS. 20 and 21.
Figure 23:
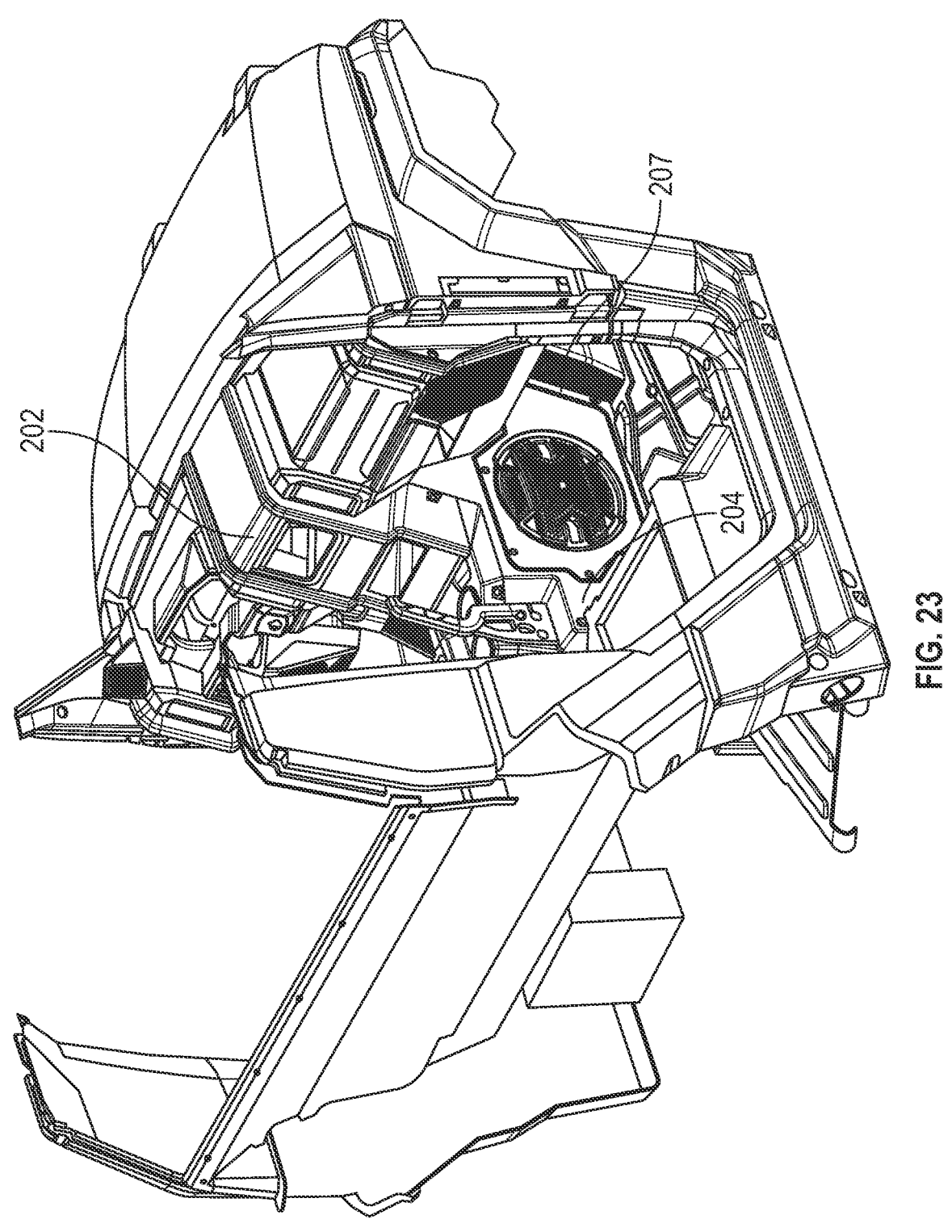
FIG. 23 is a perspective view of a dashboard assembly and console that has a dual purpose enclosure portion.

Referring to FIGS. 20 to 22, an embodiment of a lower spanning molded polymer dashboard member 175 has a pair of enclosure portions 177, 178 that are unitary with the rest of the polymer dashboard member. The enclosure portions having a mounting interface portion 181 including a flat sealing surface 183. The enclosure portion further defining a cavity 186 and having an opening 187 that opens rearwardly toward the side by side seating. The enclosure portion may receive a storage cover 187.2, that engages at the mounting interface portion 181. The speaker unit 184 depicted has a unitary baffle panel 186 with an aperture 188 to receive a speaker such as a 4 inch, a 5½ inch, or a 6½ inch midrange speaker and further has a tweeter mounting platform 190 may provide a desired angulation for aiming the tweeter 192. A grill 194 may be spaced from the baffle panel such as by stand-offs 197 for providing clearance for the angulation of the tweeter. The baffle panels and grills as disclosed herein may be formed from injection molded polymers such as polyethylenes, polypropylenes, nylons, polycarbonates, and other polymers and copolymers and composite materials.

Figure 24:
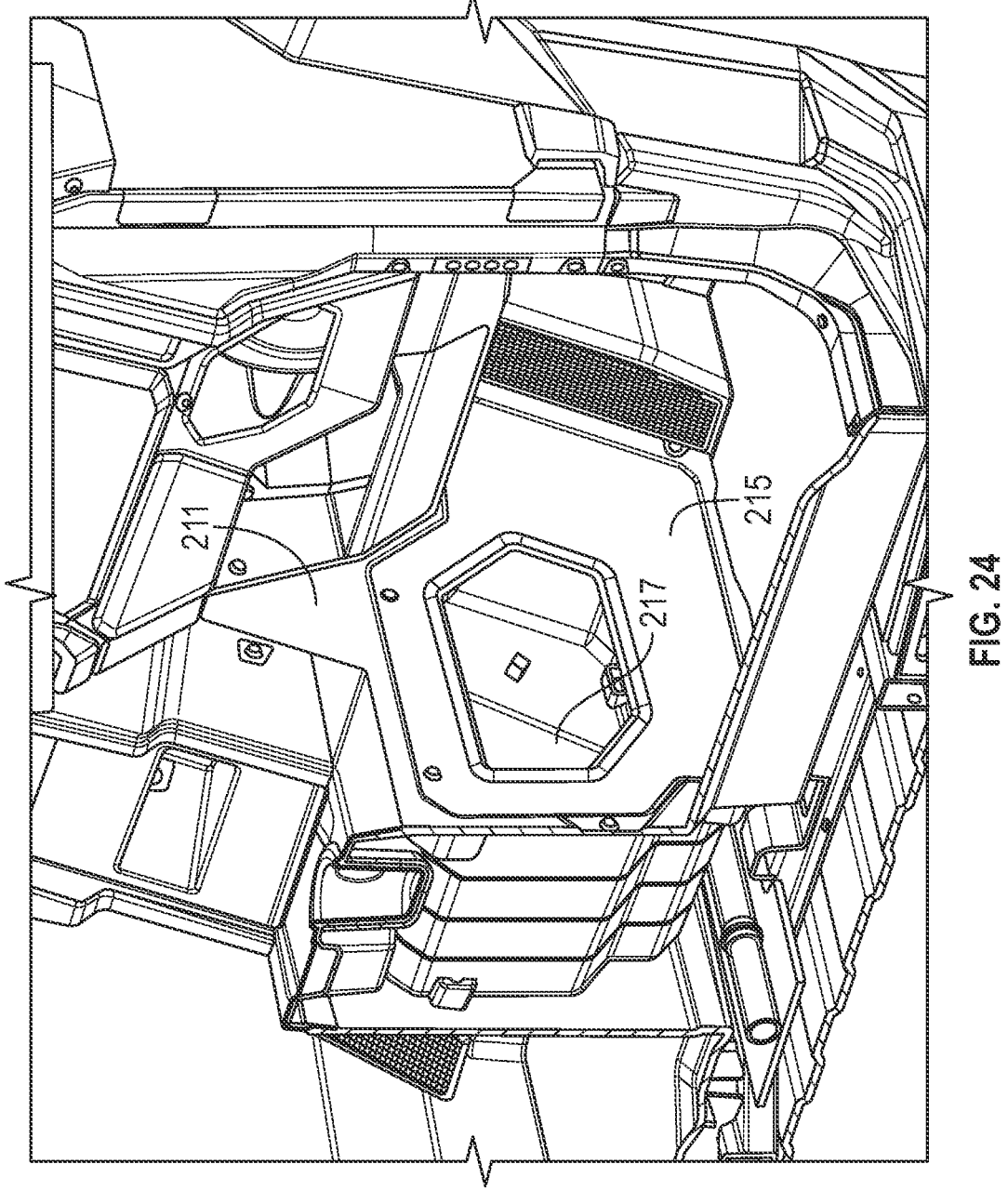
FIG. 24 is a perspective view of the console of FIG. 23 with a storage cover mounted on the enclosure portion.
Figure 25:
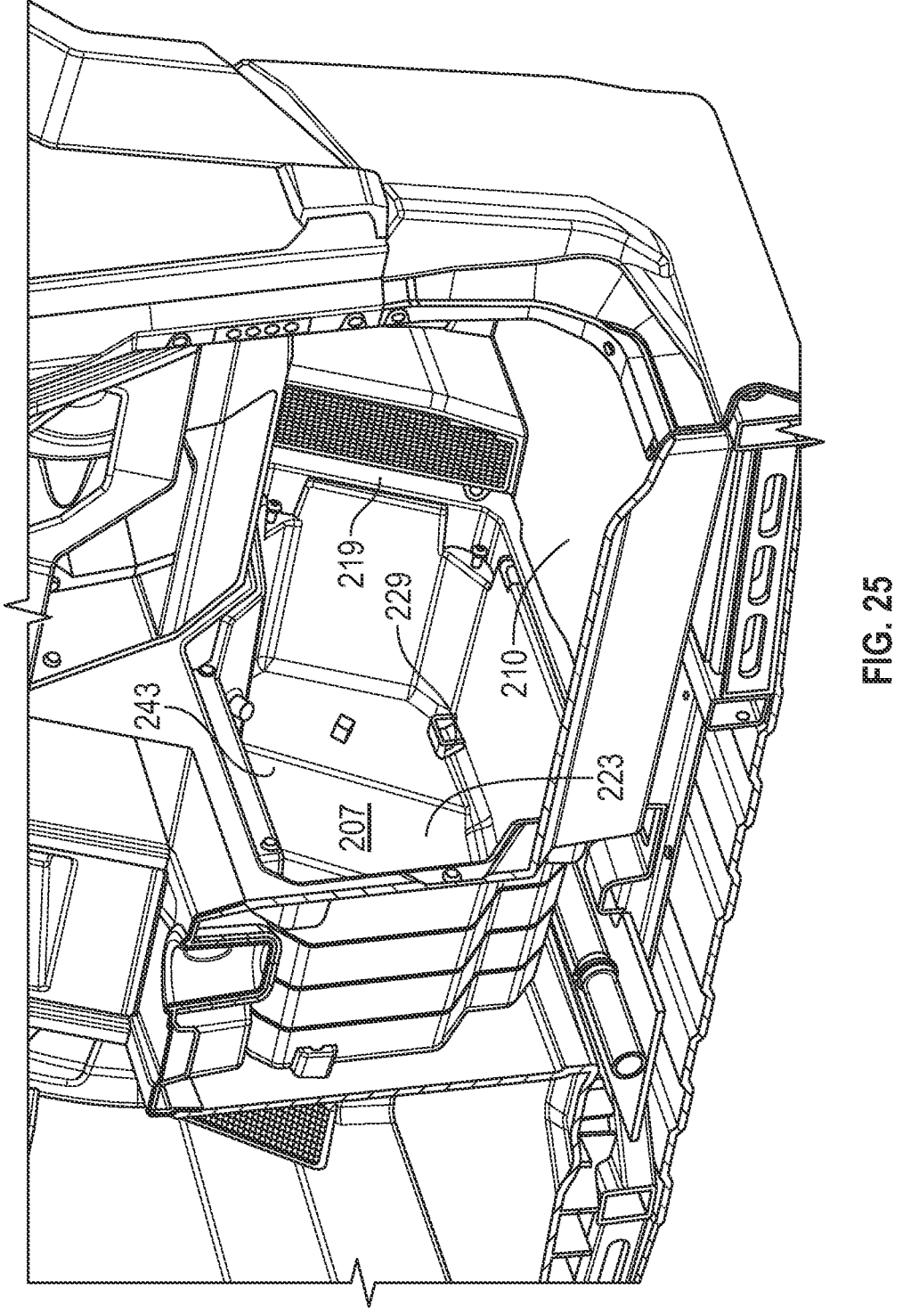
FIG. 25 is a perspective view of the console of FIGS. 23 and 24 with the storage cover removed showing the interior of the enclosure portion.
Figure 26:
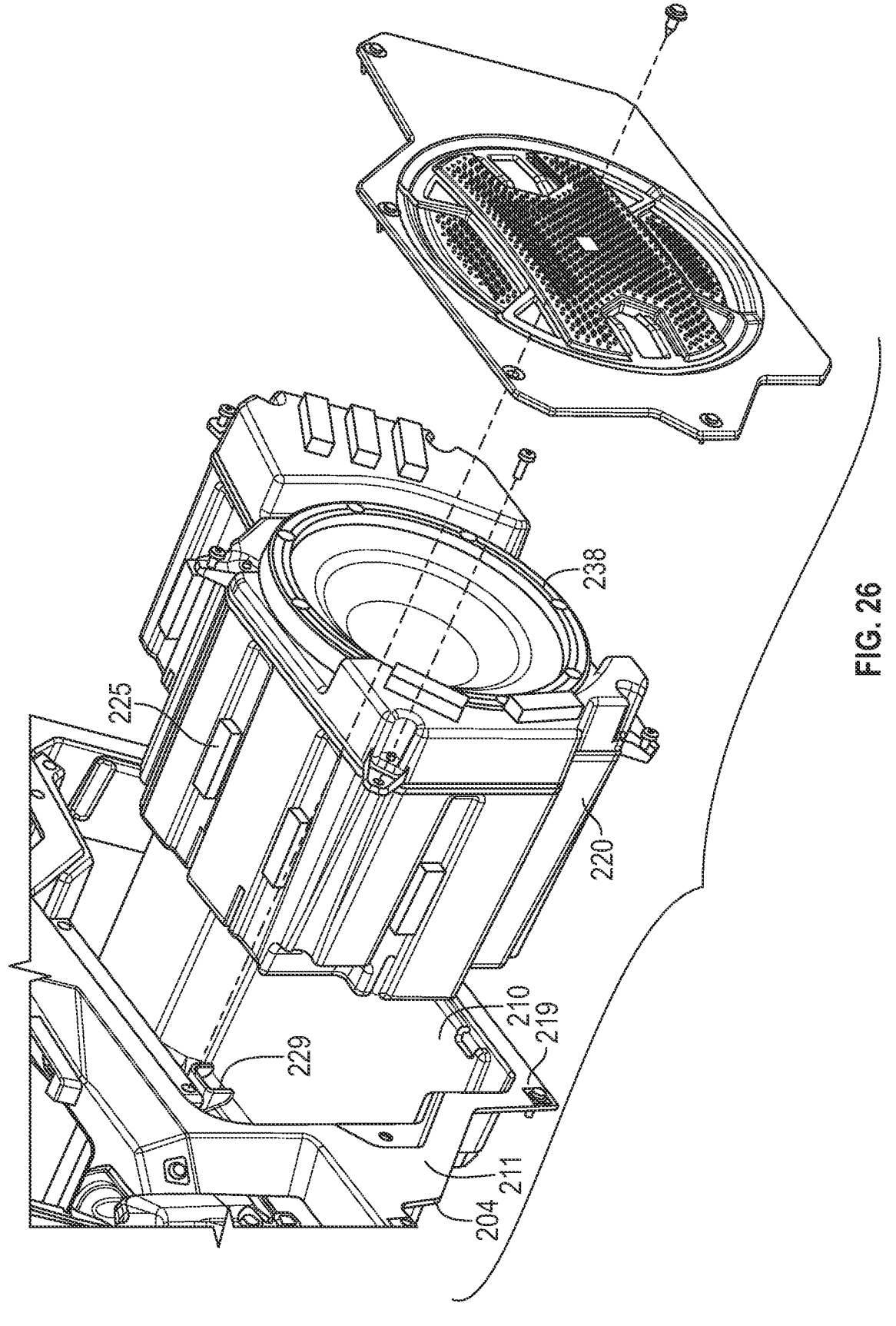
FIG. 26 is a perspective view of a removable sealed speaker housing with a sub woofer mounted therein, the sealed speaker housing shown as conformingly shaped and sized to the interior of the enclosure portion of the console.
Figure 27:
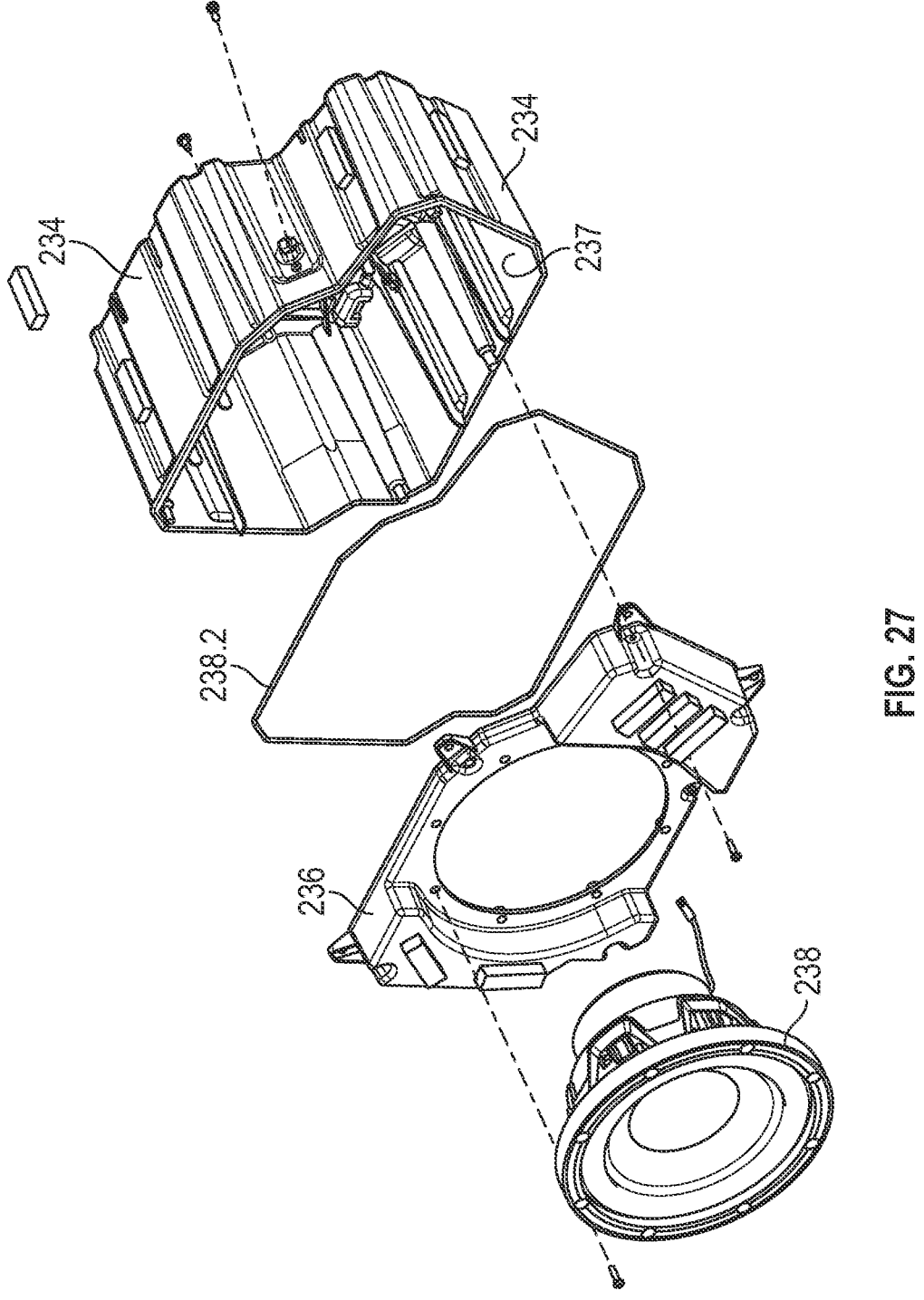
FIG. 27 is an exploded view of the sealed speaker housing.
Figures 28, 29:
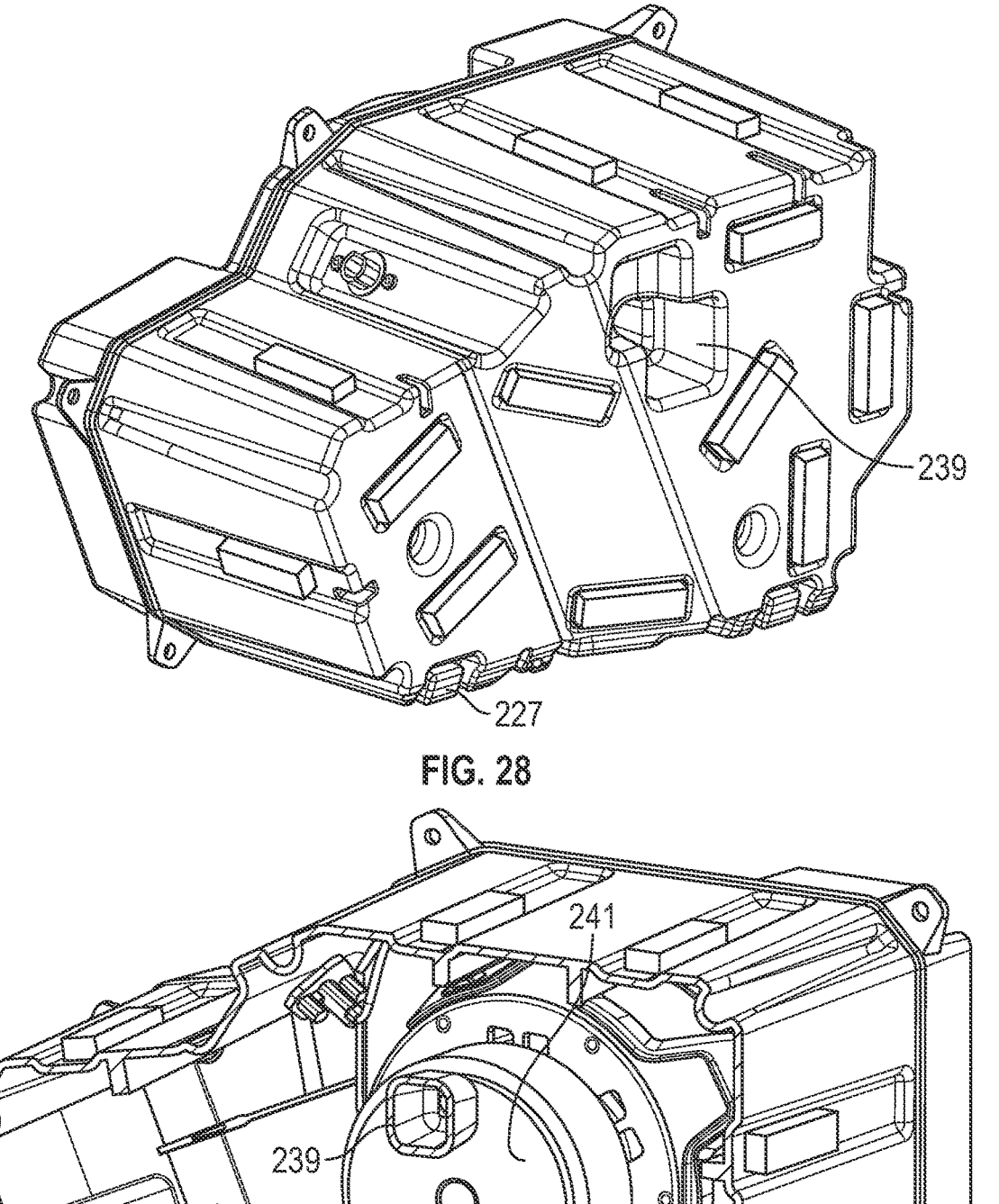
FIG. 28 is a perspective view of the backside of the sealed speaker housing of FIGS. 26 and 27.
FIG. 29 is a cross sectional view of the sealed speaker housing of FIGS. 26-28.

Referring to FIGS. 23 to 29, a dashboard assembly 202 and console 204 of a recreational vehicle is depicted with the console 204 providing a speaker receiving receptacle configured as an enclosure portion 207 that is convertible from a storage enclosure to a speaker enclosure. The console 204 having an opening or access port 210 at the right side 211 of the console, the opening sized substantially equal to the internal cross sectional area of the enclosure portion. FIG. 24 depicts a storage cover 215 closing the side opening 210 and providing a reduced area access port 217. FIG. 25 illustrates the enclosure portion with a mounting interface 219 extending about the opening. FIG. 26 illustrates the conforming shape of a speaker unit configured as a separate sealed speaker unit 220 and that it can be readily inserted or removed from the enclosure portion 207. When inserted, the separate sealed speaker unit 220 can engage the interior wall surfaces 223 of the enclosure portion by way of the foam spacers 225. Threaded fasteners 226 may secure the speaker unit 220 into the enclosure portion 207. Additionally, rear catches 227 on the speaker unit 220 can interface with cooperating structure 229 in the interior of the enclosure portion. The separate sealed speaker unit 220 has a housing 231 that provides five closed sides 234 and one open side 237. A baffle plate 236 with receives the sub-woofer speaker 238 and closes the openside of the housing and seals with a seal or gasket 238.2. An inset portion 239 of the housing on the rear side projects inwardly to attach to the speaker magnet 241. The interior wall 243 of the enclosure portion and console, when engaged with the housing 231 of the speaker unit acts as a radiator providing enhances bass performance in the passenger area.

Referring to FIGS. 30-32D, a recreational vehicle may have, behind the seating, and between the passenger area 140 and a rear engine area, a close off panel 246 supported by the vehicle frame. The close off panel 246 may be formed of polymers or composites and may have a rearwardly extending enclosure portion 247 defining a recess 249 open forwardly that provides a storage region 250, accessible behind the seat and forward of the engine area. In side by side vehicles, the forward backward distance for the storage area and speaker enclosures is limited due to placement of the engine and related components in close proximity to the seating area. In embodiments, the forward rearward distance is 4 to 8 inches resulting in a recess storage area depth of approximately 4 to 7 inches. In embodiments, the forward rearward distance is 3 to 10 inches resulting in a recess storage area depth of approximately 3 to 10 inches. In embodiments, the depth of the enclosure portion is less than the height of the enclosure portion and less than the side to side width of the enclosure portion. In embodiments, the depth of the enclosure portion is less than half the height of the enclosure portion and less than half the side to side width of the enclosure portion. This storage region 250 is not as accessible as other storage locations in side by side vehicles in that the seat ahead of the storage area needs to be moved out of the way to access the space. But for the limited depth, the positioning behind the seat location would be an ideal location of a subwoofer in that the subwoofer audio frequencies do not require direct orientation toward listeners.

The storage enclosure may be converted to an effective closed speaker enclosure with the speaker baffle assembly 252 depicted in FIGS. 32A-32C. In embodiments, the speaker baffle assembly has a pair of 8 ohm, 8 inch subwoofers 253, 254 attached to the baffle panel 255. The speaker baffle assembly 252 seated on the interface 256; the volume defined rearward of the speaker baffle assembly 252 and the enclosure portion configured to be in the range of 10 to 15 liters. The speakers may be wired in parallel providing a combined 4 ohm impedance for an amplifier 257. The amplifier 257 may conveniently be attached to the close off panel 246 or other locations. A self-supporting porous fibrous panel 258 may be conformingly shaped to forward side of the close off panel 246 and the forward side of the speaker baffle assembly 252 and attached and attached thereto with threaded fasteners. A rigid frame 259 formed of metal or a rigid polymer provides edge support for the baffle panel 255. The pair of 8 inch subwoofers with the limited depth of the enclosure portion providing audio performance equivalent or better than a single 12 inch subwoofer in a closed box arrangement. FIG. 32 illustrates the speaker baffle assembly 252 mounted to the enclosure portion with the self-supporting fibrous porous panel 258 open forwardly to the passenger area 140 of the side by side vehicle.

Referring to FIGS. 33-35, a recreational vehicle has a pair of A-Pillars 262, 264, which have polymer moldings or coverings 267, 269 thereon. The inside facing wall of the polymer coverings on each of the A-Pillars may have a speaker receiving receptacle 271 including a recess 274 defined therein for receiving a tweeter 275, one for each A-Pillar. The tweeter is slightly recessed and the angulation of the tweeter provided by the recess configuration, may be slightly towards the passenger. In embodiments, enhanced performance was found if the tweeters were angled 3 to 5 degrees from direct aim at each other rearwardly toward the passengers. If the side by side is not sold with audio, the recess in the polymer coverings on the A-Pillars may have a blank covering the speaker receiving receptacle 271. If the owner wishes to retrofit audio and add speakers, the speaker receiving receptacle is available. The user may remove the blank plate, not shown, and install the tweeter 275 and then add the grill 279.

Referring to FIGS. 9 and 36-41, a front portion of a recreational vehicle 290 is illustrated and has a dashboard assembly with an upper molded polymer spanning dashboard member 95, with a pair of speaker receiving receptacles 294, 295 configured as upwardly projecting polymer portions 297, 298. Each receptacle 294, 295 has a unitary panel 302 with an aperture 304 that receives a tweeter 307 by way of threaded fasteners 310 extending through the tweeter flange 311 into threaded inserts 314 attached to the wall 316 of the receptacle 294. A grill cover 321 with tabs 322 may be received by slots 324 at a mounting interface 326 of the speaker receiving receptacle 294. As shown in FIGS. 38 and 39, when the tweeter has not been installed, a cover 340 may attached to the mounting interface 326 to cover the speaker receiving receptacle. The cover having tabs 341 matching to the adjacent dashboard structure.

The following patents are incorporated herein by reference for all purposes: U.S. Pat. Nos. 7,717,495; 8,827,020; 8,328,235; 8,613,337; 8,997,908; 9,701,346; 10,246,153; and 11,091,003.

When dimensions are cited herein or claimed and the adjective "about" is utilized in association with the specified dimension, the range of the dimension is to be considered as plus or minus 10% of the specified dimension.

All the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed.

The following clauses illustrate example subject matter described herein.

Clause 1: A recreational vehicle, the vehicle comprising: a frame, side by side seating supported by the frame and positioned in a passenger area of the vehicle, a motor supported by the frame and mounted out of the passenger area, a dashboard assembly supported by the frame and positioned forwardly of the passenger area; wherein the dashboard assembly comprises a plurality of molded unitary dashboard components including a spanning dashboard member extending substantially the widthwise distance of the passenger compartment, the spanning dashboard member having a wall portion facing rearwardly; wherein the spanning dashboard member has a left storage-speaker enclosure portion and a right storage-speaker enclosure portion, both storage-speaker enclosure portions unitary with the wall portion, each of the storage-speaker enclosure portions extending forwardly, defining a respective cavity and having a rearward facing opening, each storage-speaker enclosure portion having a mounting interface portion extending about the respective rearward facing opening, the interface portion configured for receiving separately each of a storage enclosure cover and a speaker baffle assembly, the vehicle comprising one of a) a pair of storage enclosure covers and b) a pair of speaker baffle assemblies installed to the respective mounting interface portions.

Clause 2: The vehicle of clause 1, wherein each of the mounting interface portions have a sealing surface extending about the respective opening, and wherein each of the cavities of the pair of storage-speaker enclosures have a volume defined as the volume of the respective cavity measured forwardly from the mounting interface portion, and wherein the volume of each respective cavity is from 2 to 6 liters.

Clause 3: The vehicle of clause 1 or 2, wherein each mounting interface has a plurality of apertures for facilitating attachment of one or the other or both of (a) the pair of storage enclosure covers and (b) the pair of speaker baffle assemblies.

Clause 4: The vehicle of any one of clauses 1 through 3, wherein each storage-speaker enclosure has a speaker wiring access.

Clause 5: The vehicle of any one of clauses 1 through 4, wherein the vehicle comprises the pair of speaker baffle assemblies, each speaker baffle assembly comprising: a baffle panel with a periphery and with a speaker receiving hole, and a speaker sealingly connected to the baffle panel, each periphery sealingly installed to one of the mounting interfaces.

Clause 6: The vehicle of any one of clauses 1 through 5, wherein the vehicle comprises the pair of storage enclosure covers, each of the storage enclosure covers mounted to one of the respective mounting interfaces of the left storage-speaker enclosure portion and the right storage-speaker enclosure portion, and wherein each of the storage covers have an access opening for accessing any contents in the respective left and right storage-speaker enclosures.

Clause 7: A method of retrofitting the vehicle of clause 6, from having a pair of storage enclosures to having a pair of speaker enclosures, the method comprising removing the pair of storage enclosure covers from the pair of mounting interfaces and attaching each of the pair of speaker baffle assemblies to the pair of mounting interfaces.

Clause 8: The method of clause 7, wherein the removal of the pair of enclosure covers from the respective mounting interface portions includes dislocating a plurality of tabs in a plurality of apertures at the mounting interface portion.

Clause 9: The method of clause 7 or 8, wherein the attaching of each of the pair of speaker baffle assemblies comprises utilizing threaded fasteners extending through a periphery of the respective speaker baffle assembly and into the respective mounting interface portions.

Clause 10. A recreational vehicle with an audio system, the audio system comprising a plurality of speaker units, the recreational vehicle comprising: a frame, side by side seating supported by the frame, a motor supported by the frame, a plurality of molded polymer passenger region body portions mounted about the passenger area, the plurality of molded polymer passenger region body portions having a plurality of speaker receiving receptacles, each speaker receiving receptacle having an enclosure portion defining a cavity and having a mounting interface extending around an opening of the respective cavity, each of the plurality of speaker units form fit to and inserted into and attached to a respective one of the plurality of speaker receiving receptacles utilizing the respective mounting interface.

Clause 11. The recreational vehicle of clause 10, and wherein the mounting interface of each speaker receptacle having an inset portion with a sealing surface, wherein each speaker unit comprises a baffle panel and a speaker attached thereto, the baffle panel having a periphery configured to the inset portion.

Clause 12: The recreational vehicle of clause 10 or 11, wherein at least one of the speaker units comprises a sealed enclosure with a speaker attached to a speaker opening in the sealed enclosure.

Clause 13: The recreational vehicle of clause 12, wherein the speaker is a subwoofer, the sealed enclosure has a volume of at least 20 liters, and the respective one of the plurality of molded polymer passenger region body portions with a speaker receiving receptacle is a console forward of the side by side seating.

Clause 14: The recreational vehicle of any one of clauses 10 through 13, wherein one of the plurality of molded polymer passenger region body portions is configured as a close off panel and is positioned rearwardly of the side by side seating.

Clause 15: The recreational vehicle of any one of clauses 10 through 14, wherein one of the molded polymer passenger region body portions is a spanning dashboard member that extends widthwise across the vehicle forwardly of the side by side seating, and wherein the spanning dashboard member has two speaker receiving receptacles with enclosure portions, the two speaker receiving receptacles having two speaker units therein.

Clause 16: The recreational vehicle of clause 15, wherein the mounting interface of each speaker receptacle in the spanning dashboard member having a sealing surface, wherein each speaker unit comprises a baffle panel and a speaker attached thereto, the baffle panel having a periphery configured to and sealingly attached to the respective sealing surface.

Clause 17: The recreational vehicle of clause 15 or 16, wherein the speaker attached to each baffle panel is a mid range speaker and each baffle panel also has a tweeter attached thereto.

Clause 18: The recreational vehicle of clause 17, wherein the mid range speaker has a direction of orientation and the tweeter has a direction of orientation that is different from the mid range speaker direction of orientation and is oriented at a more upward angle.

Clause 19: The recreational vehicle of any one of clauses 10 through 18, wherein each speaker unit comprises a sealed enclosure with a speaker mounted thereto, the sealed enclosure having a volume in the range of 2.5 to 6 liters, and the speaker having a diameter of from 4 to 6.75 inches Clause 20: The recreational vehicle of any one of clauses 10 through 19, wherein each speaker unit comprises a baffle panel with a speaker hole and a speaker mounted therein, the speaker having a diameter of from 4 to 6.75 inches, wherein the enclosure portions of the speaker receiving receptacles of the one or two dashboard components have an enclosure portion when the speaker unit is mounted therein, that has a volume of from 2.5 to 6 liters.

Clause 21: The recreational vehicle of any one of clauses 10 through 20, further comprising a pair of blank covers that are attachable to the speaker receiving receptacles at the mounting interfaces.

Clause 22: The recreational vehicle of any one of clauses 10 through 21, wherein the pair of blank speaker grills are attachable by inserting a plurality of tabs into a plurality of corresponding apertures at each respective mounting interface or at apertures in a speaker baffle assemble.

Clause 23: Retrofitting a recreational vehicle to have audio with enclosed speaker enclosures, the method comprising: removing a pair of storage covers that are each attached to a left and right interface portions that extend around respective storage enclosures projecting rearwardly from the dashboard, selecting a pair of speaker baffle assemblies, each speaker baffle assembly each having a baffle panel with an opening and a speaker mounted in the opening, the baffle panel having a front side, a rear side and a peripheral edge portion, installing one of the speaker baffle assemblies to the left interface portion and the other to the right interface portion, wherein each of the speaker baffle assemblies and the respective storage enclosures provide a sealed speaker enclosure.

Clause 24: The method of clause 23, further comprising installing a pair speaker grills over the left and right speaker baffle assemblies.

Clause 25: The method of clause 23 or 24, further comprising installing a subwoofer closed and sealed speaker enclosure into a storage compartment in a console of the recreational vehicle.

Clause 26: The method of any one of clauses 23 through 25, further comprising installing a pair of tweeter speakers in a pair of speaker receptacles extending upward at the top of a dashboard of the vehicle by removing a pair of blank covers attached to said pair of speaker receptacles, and then fastening the pair of tweeter speakers at the said pair of speaker receptacles.

Clause 27: The method of any one of clauses 23 through 26, further comprising installing a pair of tweeter speakers in a pair of speaker receptacles at two A-pillar polymer moldings by removing a pair of blank covers from the said pair of speaker receptacles and then fastening the pair of tweeter speakers at the said pair of speaker receptacles.

Clause 28: Retrofitting a recreational vehicle to have a plurality of enclosed boxed speakers, the side by side vehicle having a pair of respective enclosure portions projecting rearwardly from the dashboard and having respective mounting interface portions, the method comprising: selecting a pair of speaker units, each speaker unit each having a sealing interface surface sized to the mounting interface portions; installing one of the speaker units to a left mounting interface portion and the other one of the speaker units to a right mounting interface portion, wherein each of the speaker units and the respective storage enclosure providing a closed and sealed speaker enclosure with a volume of 2.5-6 liters.

Clause 29: The method of clause 28, further comprising selecting a pair of speaker units wherein each speaker unit has a baffle panel with a speaker hole and a speaker mounted in the speaker hole, and wherein installing speakers includes inserting a plurality of threaded fasteners through a peripheral edge portion of the baffle panel into the respective mounting interface portions.

Clause 30: The method of clause 28 or 29, further comprising selecting a pair of speaker units wherein each speaker unit has a speaker without a baffle panel and wherein installing speakers includes inserting a plurality of threaded fasteners through a peripheral edge portion of each speaker into the respective mounting interface portions.

Clause 31: The method of any one of clauses 28 through 30, further comprising selecting a pair of speaker units wherein each speaker unit has a baffle panel with a mid range speaker and a tweeter mounted to the baffle panel, and wherein installing speakers includes inserting a plurality of threaded fasteners through a peripheral edge portion of the baffle panel into the respective mounting interface portions.

Clause 32: An offroad side by side vehicle having a frame, the frame connecting to a roll cage that extends over a passenger area, the vehicle having side by side seating in the passenger area supported by the frame, the roll cage including a pair of forward A-pillars extending upwardly from the chassis at a left side and a right side of the vehicle and with a dashboard supported by the chassis and extending between the forward pillars, the dashboard comprising a dashboard assembly of spanning polymer molded members for supporting dashboard componentry, the dashboard assembly comprising an uppermost spanning member having a wall portion, the wall portion having a pair of raised upwardly projecting tweeter mounting structures, one of the pair of mounting positioned interior of each of the A-pillars, the tweeter mounting structures comprising a flat panel portion with an aperture for receiving a tweeter and an enclosure interface for receiving either a speaker grill or a blank structure, the flat panel portion facing at an angle above horizontal, rearwardly and toward a middle or right side of the side by side seating.

Clause 33: A recreational vehicle adapted to receive an audio system, the audio system comprising a plurality of speaker units, the recreational vehicle comprising: a frame, side by side seating supported by the frame, a motor supported by the frame, a plurality of injection molded passenger region body portions mounted about the passenger area, a plurality of the molded polymer passenger region body portions each having a respective one or two unitary speaker receiving receptacles, each speaker receiving receptacle having a mounting interface for attachment of a speaker unit.

Clause 34: The recreational vehicle of clause 33, wherein the molded polymer passenger region body portions comprise a pair of A-pillar moldings with the mounting interface sized for receiving a tweeter.

Clause 35: The recreational vehicle of clause 34, wherein the mounting interface aims the tweeter rearward and laterally.

Clause 36. The recreational vehicle of clause 35, further comprising the tweeters.

Clause 37: The recreational vehicle of any one of clauses 33 through 36, wherein a molded polymer passenger region body portion is a spanning dashboard member with a pair of the plurality of unitary speaker receiving receptacles, each speaker receiving receptacle having a unitary enclosure portion extending rearwardly from the mounting interface, each unitary enclosure portion having a volume of between 2.5 and 6 liters.

Clause 38: The recreational vehicle of clause 37, further comprising a pair of speaker units attached to each speaker receiving receptacle at the respective mounting interface.

Clause 39: The recreational vehicle of clause 38, wherein each speaker unit is a baffle and speaker assembly.

Clause 40: The recreational vehicle of any one of clauses 33 through 39, wherein a molded polymer passenger region body portion is an upper most dashboard spanning member having a wall portion extending substantially the width of the dashboard, the spanning member having a left side speaker receiving receptacle and a right side speaker receiving receptacle, each of the left and right side speaker receiving receptacles comprising a pair of upraised tweeter mounting portions.

Clause 41: The recreational vehicle of clause 40, further comprising a pair of speaker units attached to each of the pair of upraised tweeter mounting portions.

Clause 42: The recreational vehicle of any one of clauses 33 through 41, wherein each speaker receiving receptacle has a cover extending thereover.

Clause 43. The recreational vehicle of clause 42, wherein each cover is removable attachable by way of unitary tabs on each of the covers that engage tab slots on the respective speaker receiving receptacles.

Clause 44: A recreational vehicle having a vehicle frame, the vehicle having a passenger area defined by side by side seating supported by the frame floor boards supported by the frame, a motor supported by the frame, ground engaging wheels supported by a suspension system supported by the frame, a dashboard and console attached to and supported by the frame; the vehicle having one or more polymer enclosure portions convertible between a storage mode and an audio mode; wherein the dashboard and console have a plurality of molded polymer members, wherein one or more of said plurality of members having the one or more unitary enclosure portions, each defining a cavity of at least two liters, wherein the one or more enclosure portions having an opening toward the passenger area, each enclosure portion having a mounting interface at the opening, a storage cover attachable to each mounting interface portion when the enclosure portion is in the storage mode, a speaker unit attachable to the enclosure portion at the mounting interface when the enclosure portion is in the audio mode.

Clause 45: The recreational vehicle of clause 44, wherein the speaker unit comprises a baffle with an aperture with a speaker mounted therein, the baffle having a periphery sized to conformingly fit to the mounting interface portion, wherein when the speaker unit is mounted to the mounting interface unit the speaker unit and enclosure portion provide a closed box speaker.

Clause 46: The recreational vehicle of clause 44 or 45, wherein one enclosure portion is defined by the console, the one enclosure portion closed on all sides except for a side opening, the speaker unit comprising a sub woofer unit, the sub woofer unit comprising a sealed box housing with a sub woofer mounted at one side of the box housing, the box housing conformingly sized to be receive in the enclosure portion in the console and to engage interior walls of the enclosure portion in the console.

Clause 47: The recreational vehicle of clause 46, wherein the box housing engages interior walls by way of a plurality of compressible foam members.

Clause 48: The vehicle of any one of clauses 44 through 47, wherein the mounting interface of each enclosure portion has a flat interface surface that extends entirely around the periphery of the opening of the respective enclosure portion, the flat interface surface providing a sealing surface for the speaker unit.

Clause 49: The vehicle of clause 48, wherein the flat interface surface of the mounting interface portion is at least partially inset forwardly.

Clause 50: The vehicle of any one of clauses 44 through 49, wherein the mounting interface of each enclosure portion includes a plurality of slots spaced around the enclosure periphery.

Clause 51: The vehicle of any one of clauses 44 through 50, wherein each storage cover comprising a peripheral flange conformingly shaped to one of the mounting interfaces and a closure portion unitary with the peripheral flange, wherein when the storage cover is installed, the closure portion partially closing the respective opening and projecting away from the enclosure portion toward the side by side seating.

Clause 52: The vehicle of any one of clauses 44 through 51, wherein each of the storage covers further comprise a plurality unitary tabs for attachment to the respective interface portion without separate fasteners.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A recreational vehicle, the vehicle comprising:
a frame;
side by side seating supported by the frame and positioned in a passenger area of the vehicle;
a motor supported by the frame and mounted out of the passenger area;
a dashboard assembly supported by the frame and positioned forwardly of the passenger area,
wherein the dashboard assembly comprises a plurality of molded unitary dashboard components including a spanning dashboard member extending substantially the widthwise distance of the passenger compartment, the spanning dashboard member having a wall portion facing rearwardly;
wherein the spanning dashboard member has a left storage-speaker enclosure portion and a right storage-speaker enclosure portion, both storage-speaker enclosure portions unitary with the wall portion, each of the storage-speaker enclosure portions extending forwardly, defining a respective cavity and having a rearward facing opening, each storage-speaker enclosure portion having a mounting interface portion extending about the respective rearward facing opening, the interface portion configured for receiving separately each of a storage enclosure cover and a speaker baffle assembly, the vehicle comprising one of (a) a pair of storage enclosure covers and (b) a pair of speaker baffle assemblies installed to the respective mounting interface portions.

2. The vehicle of claim 1, wherein each of the mounting interface portions have a sealing surface extending about the respective opening, and wherein each of the cavities of the pair of storage-speaker enclosures have a volume defined as the volume of the respective cavity measured forwardly from the mounting interface portion, and wherein the volume of each respective cavity is within a range from about 2 liters (L) to about 6 L.

3. The vehicle of claim 1, wherein each mounting interface defines a plurality of apertures attachment of at least one of (a) the pair of storage enclosure covers and (b) the pair of speaker baffle assemblies.

4. The vehicle of claim 1, wherein each storage-speaker enclosure has a speaker wiring access.

5. The vehicle of claim 1, wherein the vehicle comprises the pair of speaker baffle assemblies, each speaker baffle assembly comprising:
a baffle panel with a periphery and with a speaker receiving hole; and
a speaker sealingly connected to the baffle panel, each periphery sealingly installed to one of the mounting interfaces.

6. The vehicle of claim 1, wherein the vehicle comprises the pair of storage enclosure covers, each of the storage enclosure covers mounted to one of the respective mounting interfaces of the left storage-speaker enclosure portion and the right storage-speaker enclosure portion, and wherein each of the storage covers have an access opening for accessing contents in the respective left and right storage-speaker enclosures.

7. A recreational vehicle having a vehicle frame, the vehicle having a passenger area defined by side by side seating supported by the frame floor boards supported by the frame, a motor supported by the frame, ground engaging wheels supported by a suspension system supported by the frame, a dashboard and console attached to and supported by the frame;
the vehicle having one or more polymer enclosure portions convertible between a storage mode and an audio mode;
wherein the dashboard and console have a plurality of molded polymer members, wherein one or more of said plurality of members having the one or more unitary enclosure portions, each defining a cavity of at least two liters, wherein the one or more enclosure portions having an opening toward the passenger area, each enclosure portion having a mounting interface at the opening, a storage cover attachable to each mounting interface portion when the enclosure portion is in the storage mode, a speaker unit attachable to the enclosure portion at the mounting interface when the enclosure portion is in the audio mode.

8. The recreational vehicle of claim 7, wherein the speaker unit comprises a baffle defining an aperture with a speaker mounted therein, the baffle having a periphery sized to conformingly fit to the mounting interface portion, wherein when the speaker unit is mounted to the mounting interface, and wherein the speaker unit and enclosure portion provide a closed box speaker.

9. The recreational vehicle of claim 7, wherein one enclosure portion is defined by the console, the one enclosure portion closed on all sides except for a side opening, the speaker unit comprising a sub woofer unit, the sub woofer unit comprising a sealed box housing with a sub woofer mounted at one side of the box housing, the box housing conformingly sized to be receive in the enclosure portion in the console and to engage interior walls of the enclosure portion in the console.

10. The recreational vehicle of claim 9, wherein the box housing engages interior walls by way of a plurality of compressible foam members.

11. The vehicle of claim 7, wherein the mounting interface of each enclosure portion has a flat interface surface that extends entirely around the periphery of the opening of the respective enclosure portion, the flat interface surface providing a sealing surface for the speaker unit.

12. The vehicle of claim 11, wherein the flat interface surface of the mounting interface portion is at least partially inset forwardly.

13. The vehicle of claim 7, wherein the mounting interface of each enclosure portion includes a plurality of slots spaced around the enclosure periphery.

14. The vehicle of claim 7, wherein each storage cover comprising a peripheral flange conformingly shaped to one of the mounting interfaces and a closure portion unitary with the peripheral flange, wherein when the storage cover is installed, the closure portion partially closing the respective opening and projecting away from the enclosure portion toward the side by side seating.

15. The vehicle of claim 7, wherein each of the storage covers further comprise a plurality unitary tabs for attachment to the respective interface portion without separate fasteners.

16. A recreational vehicle with an audio system, the audio system comprising a plurality of speaker units, the recreational vehicle comprising: a frame, side by side seating supported by the frame, a motor supported by the frame, a plurality of molded polymer passenger region body portions mounted about the passenger area, the plurality of molded polymer passenger region body portions having a plurality of speaker receiving receptacles, each speaker receiving receptacle having an enclosure portion defining a cavity and having a mounting interface extending around an opening of the respective cavity, each of the plurality of speaker units form fit to and inserted into and attached to a respective one of the plurality of speaker receiving receptacles utilizing the respective mounting interface.

17. The recreational vehicle of claim 16, and wherein the mounting interface of each speaker receptacle having an inset portion with a sealing surface, wherein each speaker unit comprises a baffle panel and a speaker attached thereto, the baffle panel having a periphery configured to the inset portion.

18. The recreational vehicle of claim 16, wherein at least one of the speaker units comprises a sealed enclosure with a speaker attached to a speaker opening in the sealed enclosure, wherein the speaker is a subwoofer, the sealed enclosure has a volume of at least 20 liters (L), and the respective one of the plurality of molded polymer passenger region body portions with a speaker receiving receptacle is a console forward of the side by side seating.

19. The recreational vehicle of claim 16, wherein one of the plurality of molded polymer passenger region body portions is configured as a close off panel and is positioned rearwardly of the side by side seating.

20. The recreational vehicle of claim 16, wherein one of the molded polymer passenger region body portions is a spanning dashboard member that extends widthwise across the vehicle forwardly of the side by side seating, and wherein the spanning dashboard member has two speaker receiving receptacles with enclosure portions, the two speaker receiving receptacles having two speaker units therein.

* * * * *